US010425481B2

United States Patent
Falanga et al.

(10) Patent No.: US 10,425,481 B2
(45) Date of Patent: Sep. 24, 2019

(54) NODE IN A TELECOMMUNICATIONS NETWORK, A VIRTUAL NETWORK ELEMENT AND METHODS FOR RETRIEVING RESOURCE IDENTIFICATION INFORMATION

(71) Applicant: TELEFONAKTIEBOLAGET L M ERICSSON (PUBL), Stockholm (SE)

(72) Inventors: Gennaro Falanga, Torre Annunziata (IT); Giuseppe Amato, Salerno (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 452 days.

(21) Appl. No.: 14/888,731

(22) PCT Filed: May 13, 2013

(86) PCT No.: PCT/SE2013/050531
§ 371 (c)(1),
(2) Date: Nov. 3, 2015

(87) PCT Pub. No.: WO2014/185833
PCT Pub. Date: Nov. 20, 2014

(65) Prior Publication Data
US 2016/0080496 A1    Mar. 17, 2016

(51) Int. Cl.
*G06F 9/50* (2006.01)
*H04L 29/08* (2006.01)
(Continued)

(52) U.S. Cl.
CPC ...... *H04L 67/1097* (2013.01); *G06F 9/45558* (2013.01); *H04L 63/306* (2013.01);
(Continued)

(58) Field of Classification Search
CPC ....... G06F 9/45558; G06F 2009/45595; G06F 3/0631; G06F 9/5077; G06F 9/5011;
(Continued)

(56) References Cited

U.S. PATENT DOCUMENTS

2008/0049926 A1* 2/2008 Imbimbo ............ H04L 12/4641
379/225
2010/0138828 A1* 6/2010 Hanquez ............. G06F 9/45533
718/1
(Continued)

FOREIGN PATENT DOCUMENTS

WO    2012027638 A1    3/2012

OTHER PUBLICATIONS

ETSI TS 133 108 V12.9.0, Universal Mobile Telecommunications System (UMTS); LTE; 3G security; Handover interface for Lawful Interception (LI), Jul. 2015.
(Continued)

*Primary Examiner* — Oanh Duong
(74) *Attorney, Agent, or Firm* — Patent Portfolio Builders PLLC

(57) ABSTRACT

A method and a virtual network element of a virtual telecommunications network comprising a cloud infrastructure. The cloud infrastructure comprises a hypervisor arrangement managed by a cloud manager for allocating physical resources to the virtual network element. The virtual network element further comprises a module that retrieves from the hypervisor manager or from the hypervisor arrangement resource identification information identifying the physical resources (HW; NW; disk) allocated to the virtual network element managing service application.

12 Claims, 11 Drawing Sheets

(51) Int. Cl.
  *H04M 3/22* (2006.01)
  *H04L 29/06* (2006.01)
  *G06F 9/455* (2018.01)
(52) U.S. Cl.
  CPC ..... *H04M 3/22* (2013.01); *G06F 2009/45595* (2013.01); *G06F 2213/3804* (2013.01); *G06F 2213/3814* (2013.01); *H04L 67/10* (2013.01)
(58) Field of Classification Search
  CPC ...... G06F 9/50; G06F 9/5055; G06F 9/45533; G06F 9/5027; H04L 5/0035; H04L 63/10; H04L 47/70; H04L 67/10; H04M 3/22
  See application file for complete search history.

(56) References Cited

U.S. PATENT DOCUMENTS

| | | | |
|---|---|---|---|
| 2011/0185063 A1 | 7/2011 | Head et al. | |
| 2011/0307889 A1* | 12/2011 | Moriki | G06F 9/45558 718/1 |
| 2012/0311574 A1 | 12/2012 | Song | |
| 2012/0324112 A1 | 12/2012 | Dow et al. | |
| 2013/0166751 A1* | 6/2013 | Wu | G06F 9/50 709/226 |
| 2013/0227560 A1* | 8/2013 | McGrath | G06F 9/45558 718/1 |
| 2013/0339956 A1* | 12/2013 | Murase | G06F 9/505 718/1 |
| 2014/0123140 A1* | 5/2014 | Motoki | H04L 41/0806 718/1 |
| 2014/0164621 A1* | 6/2014 | Nakama | H04L 47/70 709/226 |
| 2014/0297780 A1* | 10/2014 | Zhou | H04L 67/2847 709/216 |
| 2014/0337836 A1* | 11/2014 | Ismael | G06F 9/455 718/1 |
| 2015/0234671 A1* | 8/2015 | Tomita | G06F 9/45558 718/1 |
| 2015/0339147 A1* | 11/2015 | Ponsford | H04L 67/10 718/1 |

OTHER PUBLICATIONS

ETSI TS 133 107 V12.11.0, Universal Mobile Telecommunications System (UMTS); LTE; 3G security; Lawful interception architecture and functions, Jul. 2015.

ETSI TS 102 232-1 V3.4.1, Lawful Interception (LI); Handover Interface and Service-Specific Details (SSD) for IP delivery; Part 1: Handover specification for IP delivery, Jul. 2013.

ETSI TR 102 661 V1.2.1, Lawful Interception (LI); Security framework in Lawful Interception and Retained Data environment, Nov. 2009.

ETSI ES 201 671 V3.1.1, Lawful Interception (LI); Handover interface for the lawful interception of telecommunications traffic, May 2007.

Liu et al., NIST Cloud Computing Reference Architecture, Recommendations of the National Institute of Standards and Technology, Special Publication 500-292, U.S. Department of Commerce, Sep. 2011.

Draft ETSI DTR 101 567 V0.1.1, Lawful Interception (LI); Cloud/Virtual Services (CLI), Nov. 2012.

3GPP; 3GPP TS 33.106 V8.0.0 Technical Specification, 3rd Generation Partnership Project; Technical Specification Group Services and System Aspects; 3G security; Lawful Interception requirements (Release 8); Dec. 2007; 11 pages.

ETSI; "ETSI TR 102 661 V1.2.1 Technical Report—Lawful Interception (LI); Security framework in Lawful Interception and Retained Data environment"; Nov. 2009; 46 pages.

Extended European Search Report in European Application No. 13 884 624.1 dated Dec. 21, 2016. (All references not cited herewith have been previously made of record.)

International Search Report and Written Opinion in International Applicatiion No. PCT/SE2013/050531 dated Apr. 4, 2014. (All references not cited herewith have been previously made of record.)

Office Action in International Application No. PCT/SE2013/050531 dated Jul. 9, 2018.

\* cited by examiner

NODE IN A TELECOMMUNICATIONS NETWORK, A VIRTUAL NETWORK ELEMENT AND METHODS FOR RETRIEVING RESOURCE IDENTIFICATION INFORMATION

TECHNICAL FIELD

The following disclosure relates to the technical field of telecommunications networks supported by cloud infrastructure and methods in such networks and infrastructure.

BACKGROUND

In cloud networks, virtual machines are software implemented abstraction of the underlying hardware. A virtual machine (VM) is a software implementation of a machine (i.e. a computer) that executes programs like a physical machine.

The hardware, or physical resources, of nodes in a telecommunications network may be implemented as virtual machines.

Cloud based telecommunications are voice and data communications where telecommunication applications, e.g. switching and storage, are hosted by virtual machines.

Cloud communications providers deliver voice & data communications applications and services, hosting them on servers that the providers own and maintain, giving their customers access to the "cloud." Cloud services are a broad term, referring primarily to data-centre-hosted services that are run and accessed over e.g. Internet infrastructure.

A cloud infrastructure providing telecommunication services shall comply with regulatory requirements by providing lawful interception service to the authorities and by doing it with a security level equivalent to legacy telecommunication networks.

A main difference, as well as one of the fundamental benefits in a telecommunication cloud based service, is that applications providing such service are dynamically allocated as Virtual Machine (VM) over the available physical resources, e.g. computing Central Processing Unit hardware resources (CPU HW), network resources (NW) and disk server resources (disk). Said VM can be quickly created, cloned, destroyed and can be live migrated also on physically remote infrastructure along with the related data.

For example, in Lawful interception the IAP (Interception Access Point) function is a part of the virtualized application, the IAP will follow the application's lifecycle and its live motion over the geographically distributed cloud infrastructure.

Maintaining logs of LI (Lawful Interception) related activities are mandatory in case of investigation following a security incident and to be able to confirm on a court trial that the interception has been correctly executed according to the requested warrant as well as the result is reliable and not manipulated. Related security requirements are clearly stated in the main LI standards as 3GPP TS 33.108, 3GPP TS 33.107 and in the ETSI 102 661.

The dynamicity of virtual application location and creation/destruction/migration lifecycle in a cloud deployment introduces several problems to LI logging activity. Assume the following two cases:

1. Two subsequent intercepted sessions for the same subscriber can be executed by different virtual machines possibly located on a different physical resource (deployed in the same or in different countries).

2. An intercepted session can be moved along with the hosting virtual machine live motion to another cloud and physical resource (in the same or a different country).

One problem is that in both case the LI events will be reported from the same IAP identity (e.g. IP (Internet Protocol) address or Network Element Identity (NEID)) in a node of a telecommunications network, but actually the LI events could be performed on a different location even distributed on different countries. This could make invalid part of the interception or in the best case could need to apply a different regulation to information intercepted in a country respect to one intercepted in the other country (e.g. subscriber location info could be not allowed to be intercepted in one of the two countries).

In order to differentiate the interception policy according to regulation it is then fundamental to know resource identification information identifying the physical resources allocated to a virtual network element hosted by a virtual machine that manages the intercepted sessions. Said resource identification information is not available in the virtual network element and corresponding virtual machine.

SUMMARY

One problem to be solved is to collect resource identification information identifying the physical resources allocated to a virtual network element managing service applications, e.g. intercepted sessions and to distribute resource identification information to enable the capability to legally validate and audit the entire interception process executed in telecommunication cloud network infrastructure by an Internal Intercepting Function.

Said problem is achieved by the different aspects and embodiments thereof presented in this disclosure.

According to one aspect, a node and embodiments thereof in a telecommunications network are provided. The node and the embodiments thereof are supported by a cloud infrastructure comprising a hypervisor arrangement and a cloud manager for dedicating by creating a virtual network element and allocating physical resources and service applications to the node by means of the dedicated virtual network element. The service applications are executable on the virtual network element by means of the physical resources. The virtual network element comprises a module configured to retrieve, from the hypervisor arrangement and/or cloud manager, resource identification information identifying the physical resources allocated to the virtual network element hosting the executable applications, and to transmit the resource identification information to one or more executable applications.

According to another aspect, a method and embodiments thereof are provided. The method and the embodiments thereof enable retrieving resource identification information identifying physical resources allocated to a node in a telecommunications network. The node is supported by a cloud infrastructure comprising a hypervisor arrangement and a cloud manager for dedicating by creating a virtual network element and for allocating physical resources and service applications to the node by means of the dedicated virtual network element. The applications are executable on the virtual network element by means of the allocated physical resources. The method comprises retrieving from the hypervisor arrangement and/or cloud manager resource identification information identifying the physical resources allocated to the virtual network element hosting the executable applications and transmitting the resource identification information to one or more executable applications.

According to further one aspect, a virtual network element comprised in a cloud infrastructure is provided. The virtual network node comprises a hypervisor arrangement and a cloud manager for allocating physical resources to the virtual network element. The virtual network element hosts one or more applications executable on the virtual network element. The virtual network element hosts computer program software comprising instructions, which when executed by the physical resources allocated to the virtual network element causes the physical resources to perform the method and embodiments thereof.

One advantage with the described embodiments is that they provide a greatly simplified correlation of Interception Related Information and the virtualized IIF producing the IRI in a cloud infrastructure. The resulting correlation enables a LEA, Law Enforcement Agency, or a telecommunication operator to easily audit and validate a correct execution of an interception.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
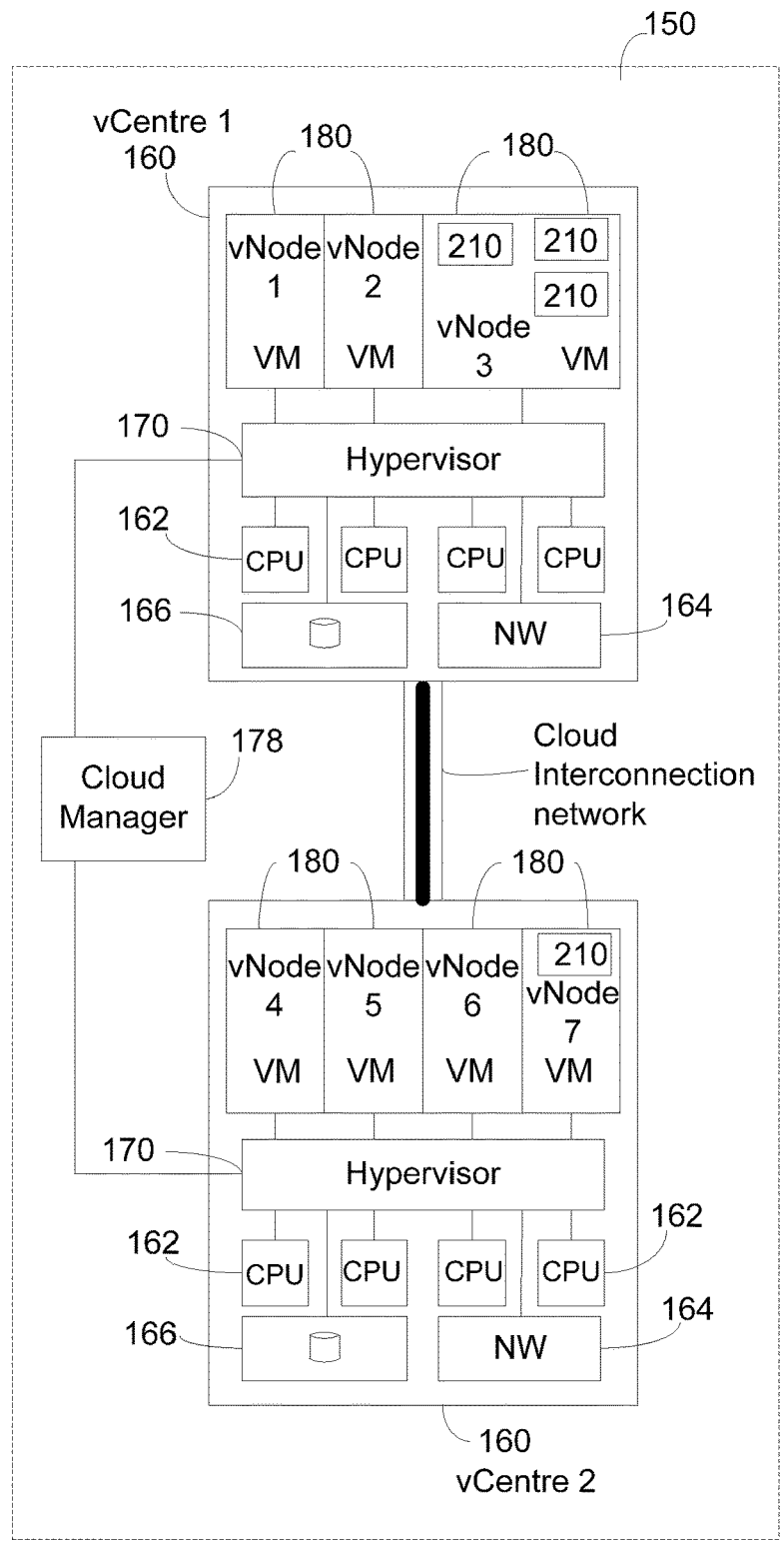
FIG. 1 is a block diagram of schematically illustrating of a LI system according to prior art.

FIG. 1 illustrates an example of a cloud infrastructure according to prior art.

In general, a telecommunications network having cloud infrastructure 150 is a system and network providing telecommunication services by means of service applications. A service application may be any software based function in a node of a telecommunication network, e.g. Mobile Switching Centre Functions, Base Station Controller function, Home Location Register function, etc. At least one node of the nodes in a telecommunication network is supported by the cloud infrastructure's physical resources, e.g. computing Central Processing Unit hardware resources (CPU HW), network resources (NW) and disk server resources (disk).

Telecommunication services refer to data-centre-hosted services that are run and accessed over a telecommunication network. A three-layered model may be used for illustrating the cloud infrastructure of a telecommunications network: service layer, a resource abstraction and control layer, and physical resource layer. The data-centre-hosted application service software belongs to the service layer. A Cloud provider defines interfaces for Cloud Consumers to access telecommunication services. Further, a resource abstraction and control layer is defines, which layer involves the system components to provide and manage access to the physical computing resources through software abstraction. Examples of resource abstraction components include software elements such as hypervisor, virtual machines, virtual data storage, and other computing resource abstractions. The resource abstraction needs to ensure efficient, secure, and reliable usage of the underlying physical resources. While virtual machine technology is commonly used at this layer, other means of providing the necessary software abstractions are also possible. The control aspect of this layer refers to the software components that are responsible for resource allocation, access control, and usage monitoring. This is the software that ties together the numerous underlying physical resources and their software abstractions to enable resource pooling, dynamic allocation, and measured services.

The physical resource layer involves all the physical computing resources. This layer includes hardware resources, such as computers (CPU and memory), networks (routers, firewalls, switches, network links and interfaces), storage components (hard disks) and other physical computing infrastructure elements.

Following system architecture conventions, the horizontal positioning, i.e. the layering, in a model represents dependency relationships—the upper layer components are dependent on adjacent lower layer to function. The resource abstraction and control layer exposes virtual cloud resources on top of the physical resource layer and supports the service layer where cloud services interfaces are exposed to Cloud Consumers which do not have direct access to the physical resources.

A service application in a telecommunication cloud infrastructure 150 is a software application dynamically allocated as a VM over the available physical resources, e.g. computing Central Processing Unit hardware resources (CPU HW), network resources (NW) and disk server resources (disk). Said VM can be quickly created, cloned, destroyed and can live migrated also on physically remote infrastructure along with the related data.

A cloud infrastructure 150 may comprise one or more virtual data centres 160 for hosting software applications providing application services. In the illustrated example, the cloud network comprises two virtual data centres 160, vCentre 1 and vCentre 2. Said virtual data centres 160 may be able to communicate with each other via a cloud Interconnection network, as illustrated. In its physical layer, each virtual data centre 160 provides physical resources HW like computing CPU HW, 162, network resources 164 and disk server resources 166. In the resource abstraction and control layer, the physical resources HW are virtualized by a hypervisor arrangement 170, which is a specialized software module.

The hypervisor arrangement 170 is configured to manage this layer allocating and keeping a consistent mapping and allocation of physical resources HW to VMs or virtual servers represented by virtual Network, virtual CPU, virtual disk and their status.

In computing, a hypervisor arrangement or virtual machine monitor (VMM) is a piece of computer software, firmware or hardware that creates and runs virtual machines.

A computer on which a hypervisor arrangement is running or executing one or more virtual machines is defined as a host machine. Each virtual machine may be denoted guest machine. The hypervisor arrangement presents the guest operating systems with a virtual operating platform and manages the execution of the guest operating systems. Multiple instances of a variety of operating systems may share the virtualized hardware resources.

On top, in order to be independent from a specific hypervisor vendor (e.g. VMware™ ESXI, KVM™, XEN™, Citrix™, etc.) an optional standard Application Programming Interface, API, layer abstracting the hypervisor proprietary API is often used.

An API is a protocol intended to be used as an interface by software components, e.g. service applications, to communicate with each other. An API is a library that may include specification for routines, data structures, object classes, and variables. An API specification can take many forms, including an International Standard such as POSIX, vendor documentation such as the Microsoft Windows™ API, the libraries of a programming language, e.g. Standard Template Library in C++ or Java API.

The API provided by the hypervisor arrangement 170 and/or standard API layer includes several primitive to query the property of the running virtual machine, i.e. virtual network element. Such API can be used also from within the virtual machine.

A cloud manager (system) 178 has a main role to provide cloud services to external entities, monitor Service Level Agreement (SLA), realize the billing platform, etc. The cloud manager 178 is also configured to manage and control several hypervisor arrangements 170.

A virtual network element 180 is a virtualized telecommunication node together with embedded service applications 210 deployed on the cloud infrastructure. The virtual network element 180 is a virtual machine, VM. An application 210 may be a service application in the service layer hosted and executed on VMs. The hypervisor arrangement 170 of a virtual data centre 160 allocates and maps the physical hardware resources to the VM. The hypervisor arrangement 170 may comprise a hypervisor layer managed by a hypervisor manager.

A virtual network element 180 on a cloud infrastructure over any available cloud resource can be lively moved within or outside the current centre, to another one even located in another country. It could be also cloned, backed up, started, stopped and destroyed along with its data via very few VM management commands.

As a consequence, the telecommunication node identities are not anymore associated to a physical host and network location but to a virtual machine. Even if the virtual machine maintains the same virtual IP, port and MAC address, the physical resource HW it runs on can vary over time and can be located in any of the geographically distributed data centres.

The virtual network element hosting an application can be moved at any time during its lifetime over a geographically distributed cloud infrastructure as well as get destroyed, recreated, cloned together with sensitive temporary data. Tracks of these changes, mainly logs, are sparsely distributed on hypervisor level, on disk manager and a number of cloud management applications that their selves can be located in different geographical sites.

Each physical resource has a unique identity.

The retrieved resource identification information HWid may be one of the following parameters:

1) IIF Virtual Network Element UUID, i.e. a unique identification (UUID) of the virtual network element.
2) Id of the hosting virtual data centre, i.e. a unique identification of the hosting virtual data centre.
3) Hardware (HW) host identifier and of the associated hardware network interfaces, i.e. a unique identifier of the physical processor, or hardware (HW) providing computational resources (CPU HW) to the virtual network element and its associated hardware network interfaces.
4) Virtual Network Element (Virtual Machine) creation time or start time;
5) Geographical location;
6) Security profile.

Of the listed collected information, the first three are identifiers which may be considered as mandatory to transmit to a certain destination address.

Solutions on the problem of keeping track of the resource identification information HWid identifying the physical resources HW allocated to a virtual network element are in the following presented.

Figure 2:
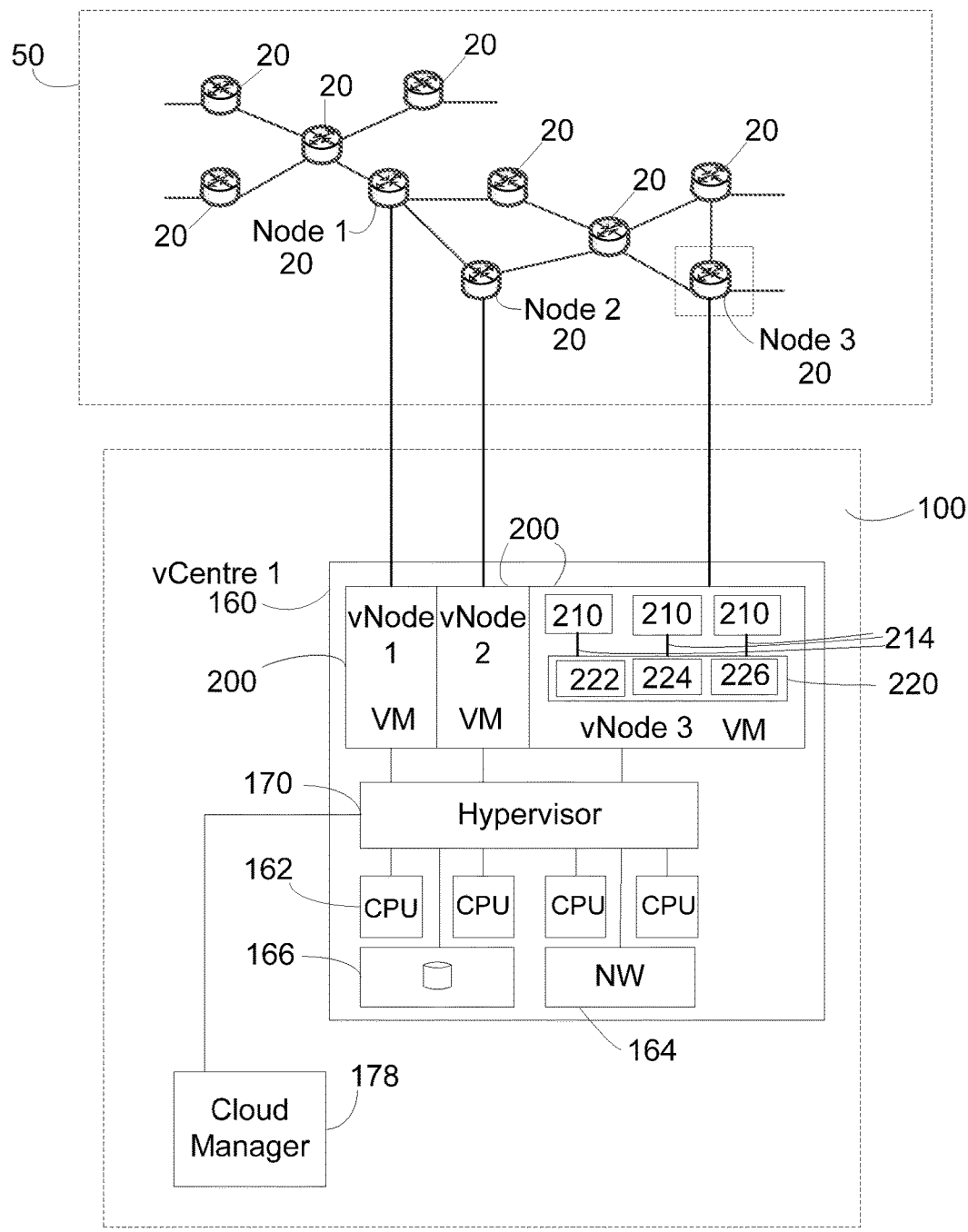
FIG. 2 is a block diagram illustrating a virtual network element in a cloud infrastructure supporting a telecommunications network.

FIG. 2 illustrates a virtual network element in a cloud infrastructure supporting a telecommunications network.

An example of a virtual network element 180 of a telecommunication cloud network according to prior art was presented above with reference to FIG. 1. Said network elements 180 differs from the network elements 200 in FIG. 2 in that the network elements 200 comprises a module 220 for retrieving from the hypervisor arrangement 170 resource identification information identifying the physical resources allocated to the virtual network element managing an application 210 being e.g. a service application.

In more detail, the cloud infrastructure 100 may comprise physical resources HW organized as one or more virtual data centres 160 for hosting service applications 210 and providing services. In the illustrated example, only one virtual data centre 160 is illustrated.

Each virtual data centre 160 provides physical resources HW like computing Central Processing Unit hardware resources (CPU HW) 162, network resources, NW, 164 and disk server resources 166. The physical resources are virtualized by a hypervisor arrangement 170, which is a module comprising specialized software. The hypervisor arrangement 170 is controlled by a cloud manager 178.

The cloud manager 178 has a main role to provide cloud services to external entities, monitor Service Level Agreement (SLA), realize the billing platform, etc. The cloud manager 178 is also configured to manage and control several hypervisor arrangements 170.

The virtual network element 200 is a virtualized telecommunication node comprising executable software applications 210 on the cloud infrastructure and it is implemented and run in a virtual machine VM. Said executable software applications 210 may be service applications hosted and executed in the virtual network element 200. The hypervisor arrangement 170 of a virtual data centre 160 allocates and maps the physical hardware resources to the virtual network element 200. The hypervisor arrangement 170 may comprise a hypervisor layer managed by a hypervisor manager.

In the example illustrated in FIG. 2, one of the network elements 200 comprises a module 220 for retrieving, from the hypervisor arrangement 170, resource identification information HWid identifying the physical resources HW allocated to the virtual network element hosting the executable service applications 210. Said module 220 and the applications 210 are able to communicate over an interface 214, preferably a secure interface 214. The protocol used over this interface may be API protocols.

Any application or application set, e.g. providing telecommunication services, running on a VM that needs the information retrieved by the module is able to include the module in its delivered software package as well as a mean to install and start up the module. More generally, the module is implemented as a service provided by the virtualization platform for each VM.

The module 220 comprises a first means 222, which object is to update and keep updated resource identification information for the applications in the virtual network element 200, e.g. in an allocated memory storage 226. The memory storage may be, e.g. a volatile cache memory. Thus, the module 220 may be configured to store the retrieved resource identification information in an allocated memory storage.

Said first means 222 is configured to send a request to the hypervisor arrangement 170 for resource identification information identifying the physical resources allocated to the virtual network element managing the executable applications 210. According to other embodiments, the first means 222 also sends a request to the cloud manager 178 for resource identification information for identifying the virtual network element 200, if any of the parameters of the resource identification information is not available in the hypervisor arrangement 170.

According to further other embodiment, the first means 222 also sends a request only to the cloud manager 178 for resource identification information for identifying the virtual network element 200, if any of the parameters of the resource identification information HWid is not available in the hypervisor arrangement 170.

In some embodiments, the first means 222 may be triggered to periodically retrieve resource identification information. In other embodiments, the first means 222 is configured to retrieve resource identification information on demand, e.g. at virtual network element start-up.

Said first means 222 is further configured to receive a response from the hypervisor arrangement 170 and/or the cloud manager 178, said response comprising the resource identification information identifying the physical resources allocated to the virtual network element managing the executable applications 210.

The resource identification information may be retrieved via an Application Programming Interface, API.

The module 220 further comprises a second means 224 configured to receive a request for resource identification information from any of the applications in the virtual network element 200. The allocated memory storage 226 is adapted to retrieve the requested resource identification information for the requesting application and the virtual network element 200 from the allocated memory storage 226. The second means 224 is further configured to send a response to the requesting application 210.

Optionally, the module 220 may further be configured to preserve integrity of the stored information by producing and checking a unique signature for the retrieved information, thereby enabling possibility to identify each stored HWid.

Thus, according to the above exemplified embodiments of the module 220, said module is capable to retrieve from the hypervisor arrangement 170 and/or the cloud manager resource identification information identifying the physical resources allocated to the virtual network element 200 managing said executable applications 210 by means of the first means 222, second means 224 and the storage means 226.

Figure 3A:
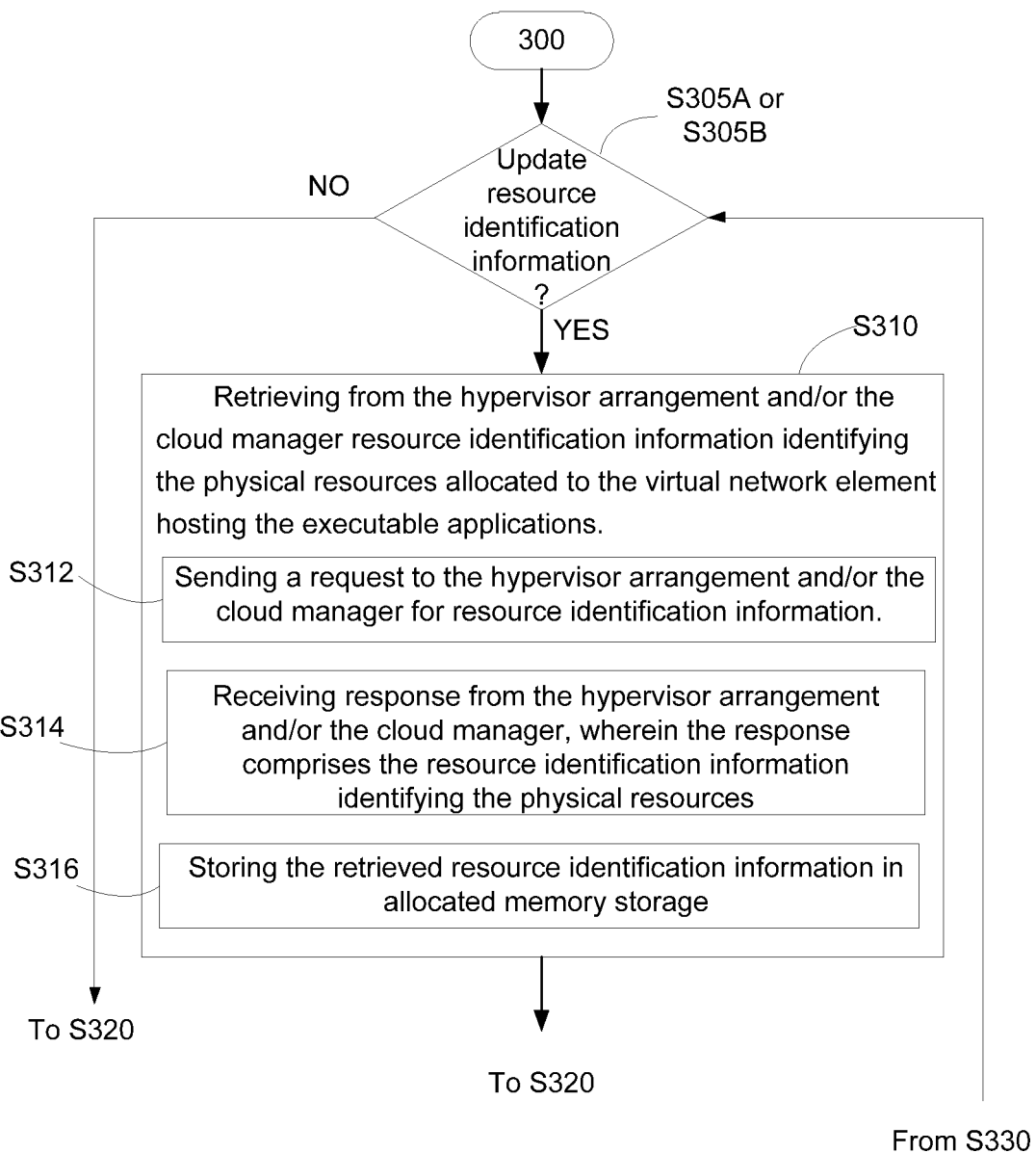
FIG. 3A is a flowchart illustrating a first sub-process of a method.
Figure 3B:
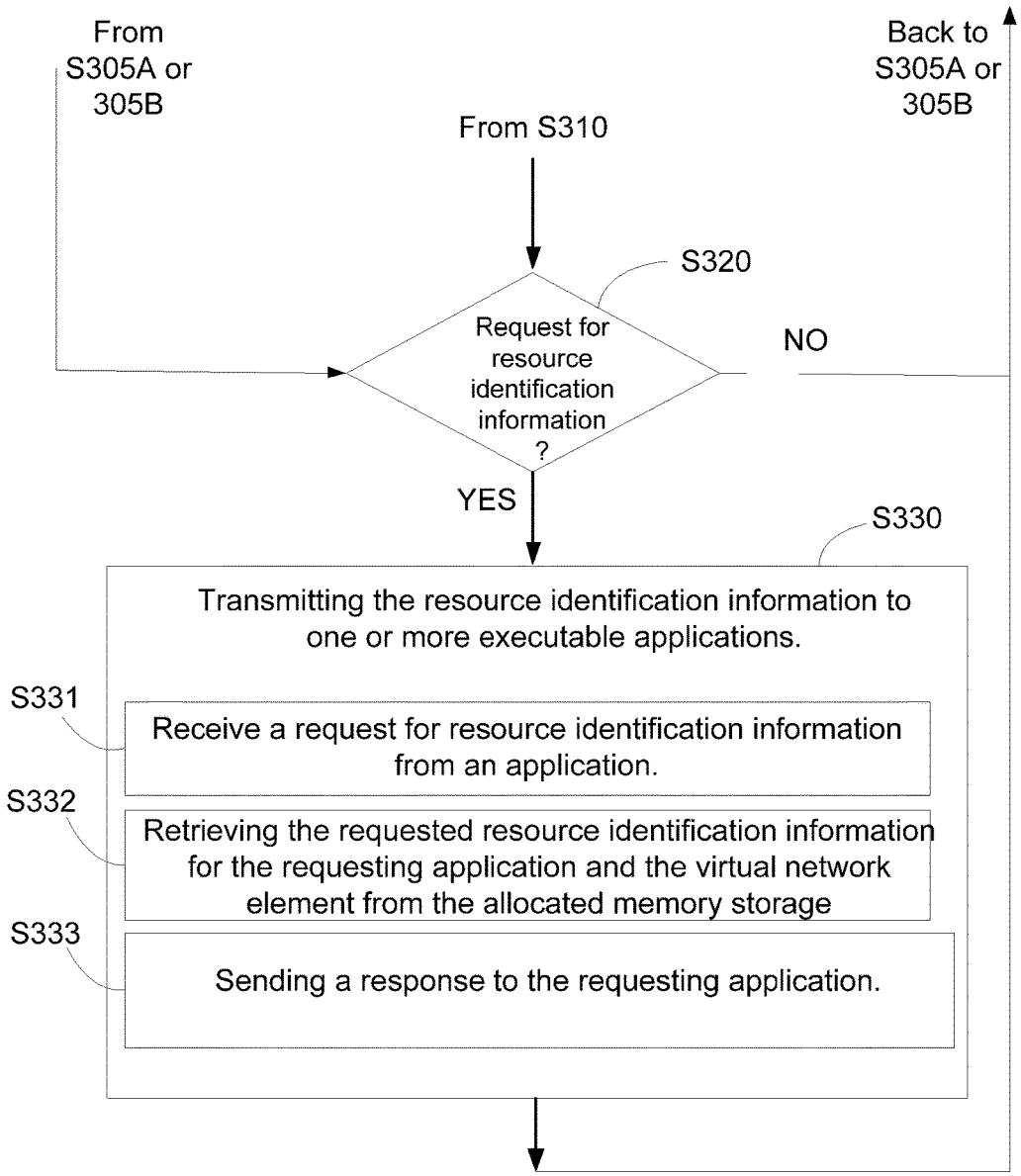
FIG. 3B is a flowchart illustrating a second sub-process of a method.

FIGS. 3A and 3B are flowchart illustrating a method and embodiments thereof for retrieving resource identification information identifying the physical resources 162, 164, 166 allocated to a virtual network node 200 supporting a node 20 in a telecommunications network.

Said node 20 is supported by a cloud infrastructure 100 comprising a hypervisor arrangement 170 for dedicating by creating a virtual network element 200 and for allocating physical resources 162, 164, 166 and service applications 210 to the node by means of the dedicated virtual network element 200. The service applications 210 are preferably computer program software that are executable on the virtual network element 200 by means of the allocated physical resources 162, 164, 166, i.e. HW CPU, NW and disk resources.

The method and embodiments thereof comprises two sub-processes, a first and a second. The first sub-process is illustrated in the flowchart in FIG. 3A, and the second sub-process is illustrated in in the flowchart in FIG. 3B.

In FIG. 3A, the first sub-process is illustrated. The first sub-process is responsible for updating the module 220, the first means 222 of the module 220 is configured to start the retrieval of HWid. Different ways of triggering or starting said retrieval could be used. Herein, two different ways are presented.

S305A: "Update resource identification information?" Triggering the retrieving of the resource identification information on demand, e.g. at virtual network element start-up. In some embodiments, the first means 222 may be triggered to periodically retrieve resource identification information.

S305B:—Periodically triggering the retrieving of the resource identification information. In other embodiments, the first means 222 is configured to retrieve resource identification information on demand, e.g. at virtual network element start-up.

When the first means 222 has been triggered to start the method according to one criterion, e.g. S305A or S305B, the method runs the first sub-process, an updating process, S310:

S310:—Retrieving from hypervisor arrangement and/or cloud manager resource identification information identifying the physical resources allocated to the virtual network element hosting the executable applications.

According to some embodiments, the first sub-process, S310, may comprise the following steps S312, S314 and S316. The first means 222 of the module 220 may perform the method by executing said steps:

S312:—Sending a request to the hypervisor arrangement and/or cloud manager for resource identification information.

Said first means 222 is configured to send a request to the hypervisor arrangement 170 for resource identification information identifying the physical resources allocated to the virtual network element managing the executable applications 210. The first means 222 may also send a request to the cloud manager 178 for resource identification information for identifying the virtual network element 200, if any of the parameters of the resource identification information HWid is not available in the hypervisor arrangement 170.

Said first means 222 is further configured to receive a response from the hypervisor arrangement 170 and/or a response from the cloud manager 178. The response or responses comprise the resource identification information. The method therefore involves, S314:

S314: Receiving response from the hypervisor arrangement and/or the cloud manager, wherein the response comprises the requested resource identification information.

The first means 222 of the module 220 may further be configured to update and keep updated resource identification information for the applications in the virtual network element 200, e.g. in an allocated memory storage 226. The memory storage may be, e.g. a volatile cache memory. Thus, the module 220 may be configured to store the retrieved resource identification information in an allocated memory storage by performing:

S316:—Storing the retrieved resource identification information in allocated memory storage.

When the retrieved and stored the requested HWid parameters, the first sub-process for updating the module 220 is finished. The module is updated with the current HWid parameters, and different executable service application 210 could be provided with said HWid information. This could be done in a second sub-process S330, wherein the HWid is transferred to a requesting service application 210.

In FIG. 3B, the second sub-process is illustrated.

The second means 224 of the module 220 is configured to start transmitting the resource identification information HWid to one or more executable applications 210 sending a request for said HWid. The second means 224 is therefore configured to receive a request for resource identification information from any of the applications in the virtual network element 200. It may therefore wait for for such a request:

S320:—"Request for resource identification information?".

As long as a request for HWid is not received, "NO", the method will be in a standby loop comprising S305 and S320. If a request for resource identification information HWid is received, the second means 224 of the module 220 is configured to start transmitting the resource identification information HWid to one or more executable applications 210 sending a request for said HWid. Thus, the method further comprises a second sub-process, S330:

S330:—Transmitting the resource identification information to one or more executable applications.

According to some embodiments, the second sub-process, S330, may comprise steps S331, S332 and S333.

The second means 224 configured to receive a request for resource identification information from any of the applications in the virtual network element 200:

S331:—Receive a request for resource identification information.

Upon a reception of a request for resource identification information, the second means 224 is adapted to retrieve the requested resource identification information for the requesting service application 210 from the allocated memory storage 226. A unique signature may be used for each HWid may be used for getting correct HWid. Thus the second sub-process may comprise S332:

S332:—Retrieving the requested resource identification information for the requesting application from the allocated memory storage.

The second means 224 is adapted to send a response to the requesting application 210, S333:

S333:—Sending a response to the requesting application.

Said module 220 and the applications 210 are able to communicate over an interface 214, preferably a secure interface 214. The resource identification information may be exchanged via an Application Programming Interface (API) layer. The protocol used over this interface may be API protocols.

When the second sub-process is finished, the method returns to the stand-by loop.

The retrieved resource identification HWid information comprises at least a unique identification (UUID) of the virtual network element. The retrieved resource identification information may also comprise a unique identification of the hosting virtual data centre, a unique identifier of the physical processor, or hardware (HW), providing computational resources (CPU HW) to the virtual network element and its associated hardware network interfaces. The retrieved resource identification information may also comprise virtual machine creation, modification or start time, geographical location or security profile.

The sub-processes can also be implemented as a process to be used by any generic virtualized applications. It is preferred, that security mechanisms are included in such embodiments for avoiding malicious manipulation of retrieved data. An example is the VIX™ API in ESXI™, which is used for storing unique identifiers, UUIDs, of the virtual machines in virtual data centres, vCenters. A UUID is used as a key to get from a vCenter the physical resources that are mapped to a virtual machine. According to another example, a known standard approach is to use OpensStack™ API as the "Get Server Detail". However, the VM UUID may have different format depending on the hypervisor type, e.g. VMware and windows hyper-V.

The embodiments described herein may advantageously be implemented in one or more computer program software that are executable on a programmable system including at least one programmable processor coupled to receive data and instructions from, and to transmit data and instructions to, a data storage system, at least one input device, and at least one output device. Each computer program software may be implemented in a high-level procedural or object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

The above module 220 is a useful tool in a virtual network element comprising one or more service applications 210. In the following discussion of this description, the use of the module 220 and embodiments thereof in a virtual network node 200 comprising a virtualized Internal Interception Function (IIF) for intercepting subscriber sessions and retrieving Communication Content and Intercepted Related Information of the intercepted sessions in a Lawful Interception (LI) system are described.

The LI solution is composed by a number of logical functions according to the ETSI/3GPP TS 33.108 standards.

Figure 4:
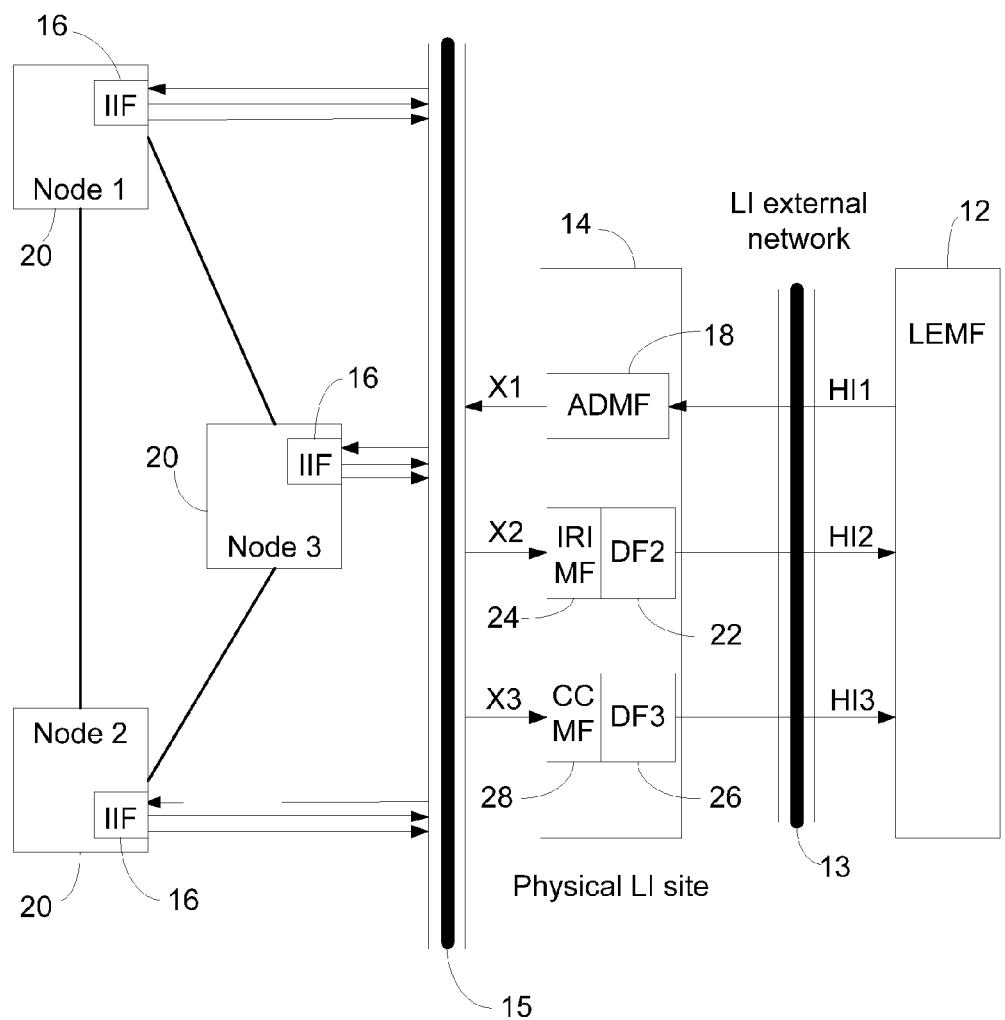
FIG. 4 is a block diagram schematically illustrating of a LI system according to prior art.

FIG. 4 is a schematic illustration of a LI system 10 according to prior art. Said figure illustrates how the logical functions map to the telecommunication application and physical nodes of a telecommunications network.

The illustrated LI system 10 comprises a Law Enforcement Monitoring Facility (LEMF) 12, a LI external network 13, a physical LI site 14, a LI internal operator network 15 and means 16 for intercepting subscriber sessions and retrieving Communication Content and Intercepted Related Information of the intercepted sessions.

The IIF means 16 comprises an Internal Interception Function (IIF). Said IIF means 16 is located in nodes 20 of a telecommunications network.

The physical LI site 14 is also denoted Intercept Mediation and Delivery Unit (IMDU) and it comprises an Administration Function (ADMF) 18, an IRI Mediation Function (IRI MF) 24, a Delivery Function (DF2) 22, a CC Mediation Function (CC MF) 28 and a Delivery Function (DF3) 26. The LI external network 13 handles the standardized interfaces HI1, HI2 and HI3 between the physical LI site 14 and the LEMF 12. The LI internal operator network 15 handles the interfaces X1, X2 and X3 between the physical LI site 14 and the nodes 20 comprising IIF means 16.

An IIF realizes the interception of the communications to/from a provisioned subscriber, even denoted as a target. The administration function, ADMF, 18 provides the identity of the monitored subscriber according to a warrant emitted by local authorities via an X1 interface. For each intercepted session by a target, the IIF produces a sequence of Intercepted Related Information, IRI, containing the information about call participants, call progress and other relevant parameters. If required by a warrant, the IIF produces also a copy of the call content transmitted and received by the monitored subscriber. Call content is denoted Communication Content, CC, according to the LI standardization. The IIFs delivers IRI to a IRI mediation function via an X2 interface and Communications Content via an X3 interface.

The IRI Mediation Function (IRI MF) 24 validates, complements with other information, formats the received IRI in a standard format, called HI2, and delivers by means of the DF2 22 the IRI to the LEMF 12 via the HI2 handover interface.

The CC Mediation Function (CC MF) 28 is a corresponding functionality as the IRI MF, i.e. it validates, complements with other information, formats the received CC in a standard format, called HI3, and delivers by means of DF3 26 the CC to the LEMF 12 via an HI3 handover interface.

The LEMF 12 is the agency facility located outside the network operator where the intercepted IRI and CC is collected and finally used by local authorities for any legal and investigation purposes.

Strong security requirements apply to the entire architecture IIF, ADMF, mediation systems. LEMF and related interfaces as described in ETSI TS 33.107, ETSI TS 201 671 and the report ETSI TR 102 661.

ANSI LI standards describe a similar architecture even if with different names for handover interfaces and some specific requirements. It is assumed that the above logical is applicable in most cases.

The IIF means 16, which is located in an IAP (Interception Access Point), are generally embedded in the telecommunication nodes 20 even if well secured and separated from normal traffic functions. The IIF means 16 are then distributed over the telecommunication operator network according to the topology designed for communication services. The IIF means 16 are connected to the physical LI site 14 via the interfaces X1, X2 and X3 and dedicated VPN (virtual private network) channels.

The physical LI site 14 is instead located in a physical secured area and network. The ADMF 18 and the mediation functions 22, 24, 26, 28 can be deployed on several HW hosts for scalability purposes but all hosts shall be anyway located in the secured network perimeter.

The LEMF 12 is an application preferably outside from the operator domain and it's not in the scope of the following aspects and embodiments thereof since its deployment is under control of local authorities and usually it is located within one jurisdiction. As illustrated in FIG. 4, all the nodes can be identified by a node name, e.g. Node1, Node2, . . . ) associated to the physical host they run on, an IP and a specific location in the physical network topology.

The LEMF, 12 requests LI services of the LI system and collects intercepted information in the system. The system shall provide access to the intercepted Content of Communications, CC, and Intercept Related Information, IRI, of a target and services related to the target on behalf of one or more Law Enforcement Agencies, LEAs. An intercept request, also denoted Request for LI activation, is sent through the first Handover Interface, HI1, to the Physical LI site, 14 comprising the Administration Function, ADMF, 18. Said Administration Function 18 generates based on said received request a warrant comprising said one or more target identities, and sends said warrant towards an IIF means 16 via the interface denoted X1. The IIF means 16 is connected to a node of a network, e.g. the Internet, or a 3 GSM (third generation Mobile Communications System), from which it intercepts said Content of Communications and Intercept Related Information of a mobile target. Said CC and IRI are network related data. As reference to the standard model, see references [1], [2] and [3], the content of communication is intercepted in the network node 20 and it is based upon duplication of target communication payload without modification. In reference [3], the interfaces HI1 and HI2 is specified in more detail. The IIF 16 sends IRI raw data via an interface X2 to a Delivery Function for IRI reporting, DF2, 22 and a Mediation Function of IRI, IRI MF 24 that generates and delivers to a collection functionality a standardized IRI report based on the received IRI report. Said standardized IRI report is sent over a standardized interface HI2 to the LEMF 12. The IIF 16 also sends CC raw data via an interface X3 to a Delivery Function for CC reporting, DF3, 26 and a Mediation Function of CC, CC MF, 28 which generates and delivers to a collection functionality a standardized CC report based on the received CC report. Said standardized CC report is sent over a standardized interface HI3 to the requesting LEMF 12.

In the current LI solution the identification of the IIF means 16 by node Id is a fundamental info for the LEA since it can be used to track back which telecommunication node executed the interception and from there if the node legitimately intercepted the subscriber, e.g. looking at logs, integrity information, etc. Moreover in case of LI security incidents it could be needed to audit the whole node's latest history.

Figure 5:
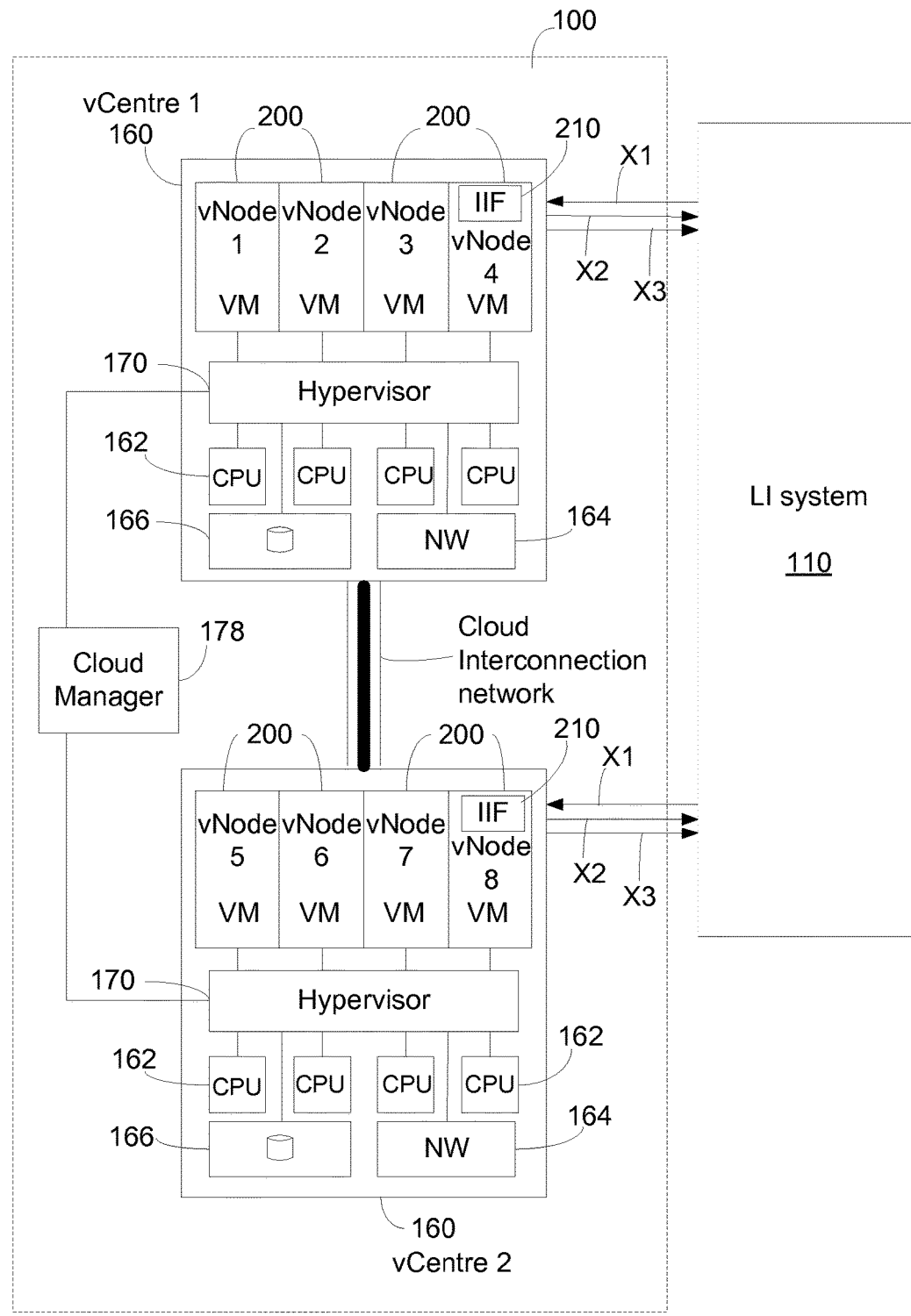
FIG. 5 is a block diagram illustrating a background example of a telecommunication network and cloud infrastructure connected to a LI system.

FIG. 5 illustrates a background example of a telecommunication network and cloud infrastructure 100 connected to a LI system.

The physical resources of the physical nodes (e.g. see nodes 20 in FIG. 4) of a telecommunication network are virtualized to virtual machines of a cloud infrastructure by means of the hypervisor arrangement 170. The hypervisor arrangement of a virtual data centre allocates and maps the physical hardware resources to a virtual machine VM.

A virtual network element 200 is a virtualized telecommunication node together with the embedded IIF deployed on a cloud infrastructure as a virtual machine VM. The hypervisor arrangement 170 of a virtual data centre allocates and maps the physical hardware resources to a virtual machine VM. The hypervisor arrangement 170 may comprise a hypervisor layer managed by a hypervisor manager. A virtual network element 200 when deployed on a cloud infrastructure can be instantiated as a virtual machine, VM, over any available cloud resource, lively moved within or outside the current centre to another one even located in another country. It could be also cloned, backup, started, stopped and destroyed along with its data via very few VM management commands.

As a consequence, the telecommunication node names are not anymore associated to a physical host and network location but to a virtual machine. Even if the virtual machine maintains the same virtual IP, port and MAC address, the resource it runs on can vary over time and can be located in any of the geographically distributed data centres.

As illustrated in FIG. 5, the cloud infrastructure may be connected to a LI system 110 via an interface. An LI system, which has been described with reference to FIG. 4, comprises a Law Enforcement Monitoring Facility (LEMF), a LI external network, a physical LI site, a LI internal operator network and IIF means which is a means for intercepting subscriber sessions and retrieving Communication Content and Intercepted Related Information of the intercepted sessions. Said means is located in nodes of a telecommunications network. The physical LI site is also denoted Intercept Mediation and Delivery Unit, IMDU, and it comprises an Administration Function, ADMF, an IRI Mediation Function (IRI MF), a Delivery Function (DF2), a CC Mediation Function (CC MF) and a Delivery Function (DF3). The LI internal operator network handles the interfaces X1, X2 and X3 between the physical LI site 14 and the nodes of the vCentres comprising IIF means.

In a telecommunication LI solution, the virtual machine hosting a IIF can be moved during its lifetime over a geographically distributed cloud HW infrastructure as well as get destroyed, recreated, cloned together with sensitive temporary data (e.g. LI logs, LI configuration, LI persistent communication buffers, etc.)

Tracks of these changes, mainly logs, are sparsely distributed on hypervisor level, on disk manager and a number of cloud management applications that their selves can be located in different geographical sites.

The problem is that even if a central cloud log collector and analyser is available it's very difficult and time consuming at the moment to correlate an interception event that happened at LI IIF virtual application level to the set of related logs at lower levels that can reveal which virtual IIF has generated the IRI, on which VM the IIF is running on and other significant security information.

The above information is fundamental when a LEA, Law Enforcement Agency, or an operator security team need to investigate about LI security incidents or validate IRI for forensic purposes by rebuilding the whole interception history from time it's ordered to final delivery to a LEA.

In a non-cloud traditional telecommunication development such correlation is possible via the IIF Network Element Identifier, NEID, and IP sent as IRI parameter. The NEID and IP are associated to a specific network location and HW host machine and the LI auditor can go on this machine, retrieve all the interesting logs (or retrieve them from a centralized log server searching b NEID) as well as collect all the network change or communication related logs to/from the IP.

In a cloud infrastructure the NEID and IP refer to virtual instance parameters are not enough to fully identify the real IRI source let auditor straightforward gather all the correlated logs. The auditor need to look at the whole virtual machine management history log of all cloud data centres, which logs imply an enormous amount of data.

Figure 6:
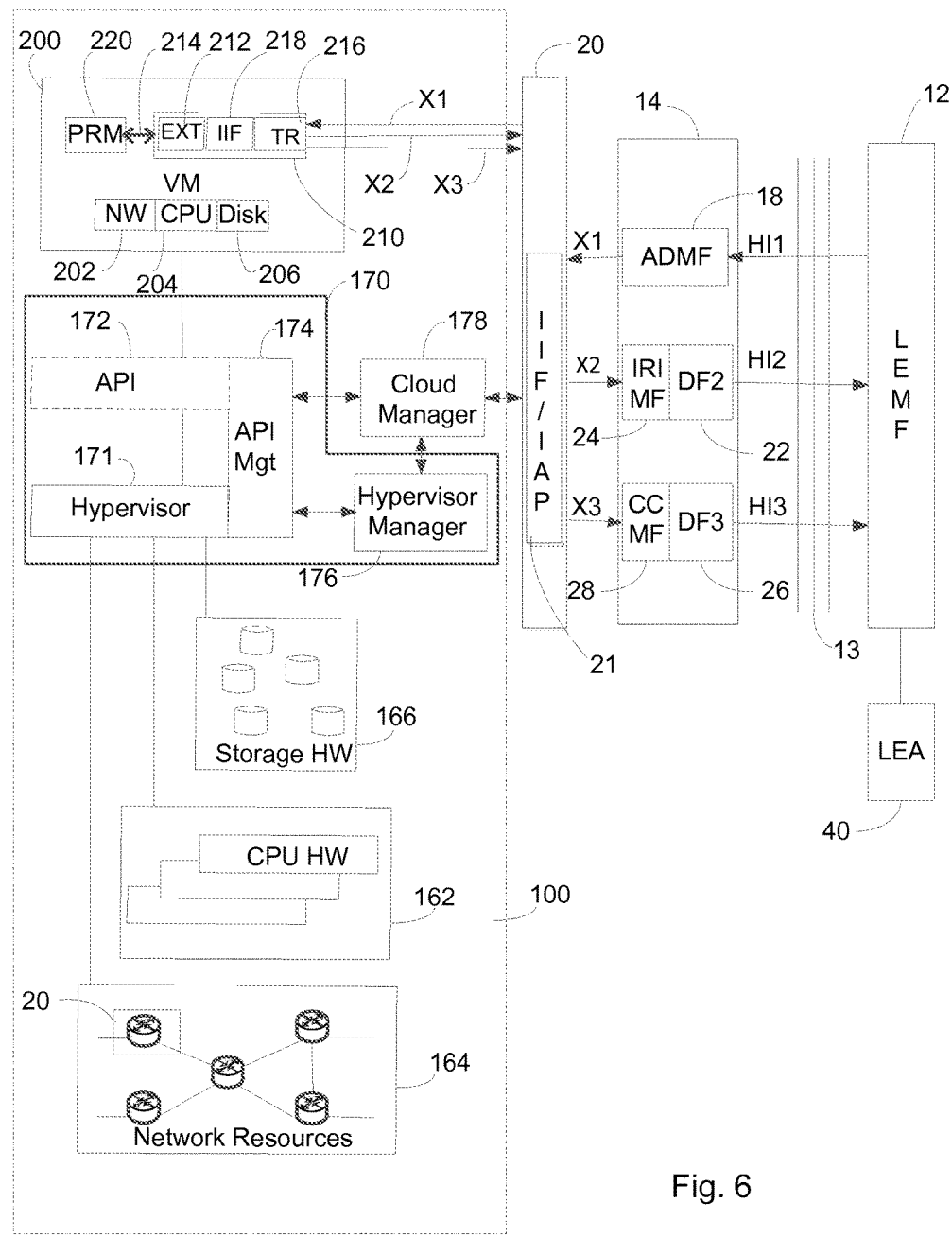
FIG. 6 is a block diagram illustrating an example of an embodiment of a LI system connected to a virtual network element comprising a virtual Internal Interception Function (IIF)

FIG. 6 illustrates another example of an embodiment of a LI system connected to a virtual network element comprising a virtual Internal Interception Function (IIF).

As illustrated in FIG. 2 above, a cloud infrastructure may comprise one or more virtual data centres 160. In the example according to FIG. 6, one virtual network element 200 of the one virtual data centre 160 is illustrated in more detail. The virtual data centre 160 provides physical resources HW like computing Central Processing Unit hardware resources (CPU HW) 162, network resources, NW, 164 and disk resources 166. The virtual network element 200 is in this embodiment a virtualized telecommunication node comprising the embedded IIF in the cloud infrastructure. The hypervisor arrangement 170 of a virtual data centre 160 allocates and maps the physical hardware resources to the virtual machine VM.

The physical resources are virtualized by a hypervisor arrangement 170 comprising a hypervisor layer 171, which is a specialized software module, and a hypervisor manager 176. The hypervisor manager 176 is configured to manage this layer 171 allocating and keeping a consistent mapping of HW resources to virtual servers represented by virtual Network 202, virtual CPU 204, virtual disk 206 and their status. Optionally, in order to be independent from a specific hypervisor vendor (e.g. VMware ESXI™, KVM™, XEN™, Citrix™, etc.), the hypervisor arrangement 170 may comprise an optional standard API layer 172 abstracting the hypervisor proprietary API. The API management means 174, API Mgt, handles the control of the API layer. An overall cloud manager 178 has then a main role to provide cloud services to external entities, monitor Service Level Agreement (SLA), realize the billing platform, etc.

The API provided by the hypervisor arrangement 170 and/or standard API layer 172 includes several primitive to query the property of the running virtual machine, i.e. virtual network element 200. Such API can be used also from within the virtual machine VM.

The virtual network element 200 comprises a service application 210 that further comprises an IIF application, i.e. a virtualized IIF means 218 for intercepting subscriber sessions and retrieving Communication Content (CC) and Intercepted Related Information (IRI) of the intercepted sessions. Said virtual network element 200 further comprises a module 220 for retrieving from the hypervisor arrangement comprising the manager 176 and the hypervisor layer 171 resource identification information identifying the physical resources, e.g. CPU HW, NW and disk, allocated to the virtual network element 200 managing the intercepted sessions, and means 216 for transmitting the resource identification information, the retrieved CC and IRI of the intercepted sessions to a collecting node (12).

The module 220 retrieves from the hypervisor arrangement 170 and/or the cloud manager 178 resource identification information identifying the physical resources, HW, NW, disk allocated to the virtual network element managing the intercepted sessions, is in this embodiment denoted PRM, Property Retrieval Module 220. It is implemented in the network element 200, which is a Virtual Machine hosting the service application 210 comprising the IIF application or part of it. Its function is to retrieve the VM info, i.e. resource identification information identifying the physical resources (HW; NW; disk) of the virtual network element, from the underlining hypervisor arrangement 170. The PRM module 220 can be built on top of different similar existing implementations and it can support and communicate with multiple platforms, i.e. hypervisor arrangement 170 comprising hypervisor managers 176 and/or hypervisor layers 171. The PRM module 220 is logically separated from the IIF application 210 since the PRM functionality is not necessarily triggered by an interception session. In some embodiments, the PRM module 220 may be triggered to periodically retrieve resource identification information. In other embodiments, the PRM module 220 is configured to retrieve resource identification information on demand, e.g. at virtual network element start-up. Further, the PRM module 220 may be configured to store the retrieved resource identification information in a volatile memory storage, e.g. in cache memory.

The PRM module 220 may be designed as the module 220 as described in connection to the illustrated example in FIG. 2.

PRM module 220 and the virtualized IIF means 218 are able to communicate over an interface 214, preferably a secure interface 214. The protocol used over this interface may be API protocols. The module 220 comprises a first means 222 configured to update and keep updated resource identification information for the applications in the virtual network element 200, e.g. in an allocated memory storage 226 may be, e.g. a volatile cache memory. Thus, the module 220 may be configured to store the retrieved resource identification information in the allocated memory storage 226. Said first means 222 is configured to send a request to the hypervisor arrangement 170 for resource identification information identifying the physical resources allocated to the virtual network element managing the virtualized IIF means 218. According to some embodiment, the first means 222 sends a request to the cloud manager 178 for resource identification information HWid for identifying the virtual network element 200, if any of the parameters of the HWid is not available in the hypervisor arrangement 170. Said first means 222 is further configured to receive response from the hypervisor arrangement 170 and/or the cloud manager 178, said response comprising the resource identification information identifying the physical resources allocated to the virtual network element managing the executable applications 210.

The module 220 further comprises a second means 224 configured to receive a request for resource identification information from any of the service applications 210 in the virtual network element 200. The second means 224 is adapted to retrieve the requested resource identification information for the requesting application and the virtual network element 200 from the allocated memory storage 226. The second means 224 is further configured to send a response to the requesting executable application, e.g. the service application 210 comprising the virtualized IIF means 218.

According to some embodiments, the PRM module 220 for retrieving resource identification information retrieves from the cloud manager 178, resource identification information for identifying the virtual network element 200, if any of the parameters of the resource identification information is not available in the hypervisor arrangement 170. The resource identification information may be further retrieved via an Application Programming Interface, API, layer.

Said PRM module 220 may further be configured to preserve integrity of the information by producing and checking a unique signature for the retrieved information.

Thus, the PRM module 220 may further be configured to retrieve the information about the virtual network element 200 on demand, e.g. at virtual network element start-up. According to other embodiments, the PRM module 220 may be configured to periodically retrieve the resource identification information about the virtual network element 200.

The retrieved resource identification information may be stored in an allocated volatile memory storage 226 associated to the module 220.

According to some embodiments, the virtual network element 200 is provided with the functionality of the virtualized IIF means 218 that enables the service application comprising the IIF means to collect information about the virtual network element, e.g. the identity of the physical resources allocated to the virtual network element, and to send the collected information together with intercepted IRI. The collected information will allow the auditor to fast collect, searching by virtual network element properties other than NEID and IP address, the available related logs from the entire cloud infrastructure.

According to some embodiments, the virtualized IIF means 218 for intercepting subscriber sessions and retrieving Communication Content and Intercepted Related Information of the intercepted sessions comprises or is connected to a collecting means 212, which is a kind of extension module, which is configured to collect the resource identification information identifying the virtual network element from the PRM module 220. Said collecting means 212 collects the resource identification information from the PRM module 220 via a secure interface 214.

The retrieved resource identification information may be one of the following parameters:
1) IIF Virtual Network Element UUID, i.e. a unique identification (UUID) of the virtual network element.
2) Id of the hosting virtual data centre, i.e. a unique identification of the hosting virtual data centre.
3) Hardware (HW) host identifier and of the associated hardware network interfaces, i.e. a unique identifier of the physical processor, or hardware (HW) providing computational resources (CPU HW) to the virtual network element and its associated hardware network interfaces.
4) Virtual Network Element (Virtual Machine) creation time or start time;
5) Geographical location;
6) Security profile.

Of the listed collected information, the first three are identifiers which may be considered as mandatory to transmit to a certain destination address in the LI address, such as a physical LI site or LEMF. The above list may be changed or extended with other parameters if useful and available given that the increment of the IRI size shall not impact on the LI performance requirements.

The parameters 4), 5) and 6), and eventually other parameters, could be retrieved directly by LEA or the mediation function in the LI site 14 from the cloud infrastructure data on the base on the bases of the first three, i.e. 1), 2) and 3). To provide them or not is a matter of balancing security, performance and national LI options.

The virtual network element 200 is provided with a PRM module 220 for retrieving from the hypervisor arrangement 170 comprising the hypervisor manager 176 and/or the hypervisor layer 171, resource identification information identifying the physical resources CPU HW, NW, disk allocated to the virtual network element 200 managing the intercepted sessions, and a service application transmitting means 216 for transmitting the resource identification information, the retrieved CC and IRI of the intercepted sessions to a collecting node 12. Preferably, said transmitting means 216 is inserted with the IIF functionality. Further, an API interface 172 is provided, which interconnects the IIF module 220 for retrieving from the hypervisor arrangement 170 comprising a hypervisor manager 176 and the hypervisor layer 171 and said means 216 for transmitting. Regarding the transmitting means 216, said means 216 is configured to collect from the collecting means 212 the resource identification information, to format it in a suitable, predetermined format and to send the information to a collecting node, e.g. in a Lawful Interception (LI) network and system. Said collecting node may be a LI site 14 comprising ADMF 18, IRI MF2/DF2 (24, 22) and CC MF3/DF3 (28, 26) functionality or a LEMF site 12 which is connected to, or connectable, via the LI site. The resource identification information is transmitted over interfaces X2 and/or X3 to the LI site and further, via interfaces HI2 and HI3 in protocols comprising dedicated data fields to the LEMF site 12 for further delivery to a LEA, Law Enforcement Agency 40.

The resource identification information is transmitted over interfaces X2, X3, HI2, HI3 in protocols comprising dedicated data fields to the collecting node 12, 14.

As a consequence, it is proposed to modify the standardized interfaces and protocols of ETSI, ETSI 3GPP and ANS for enabling transferring of the collected information, which is additional to the known information, to the mediation functions and to the LEA.

Figure 7:
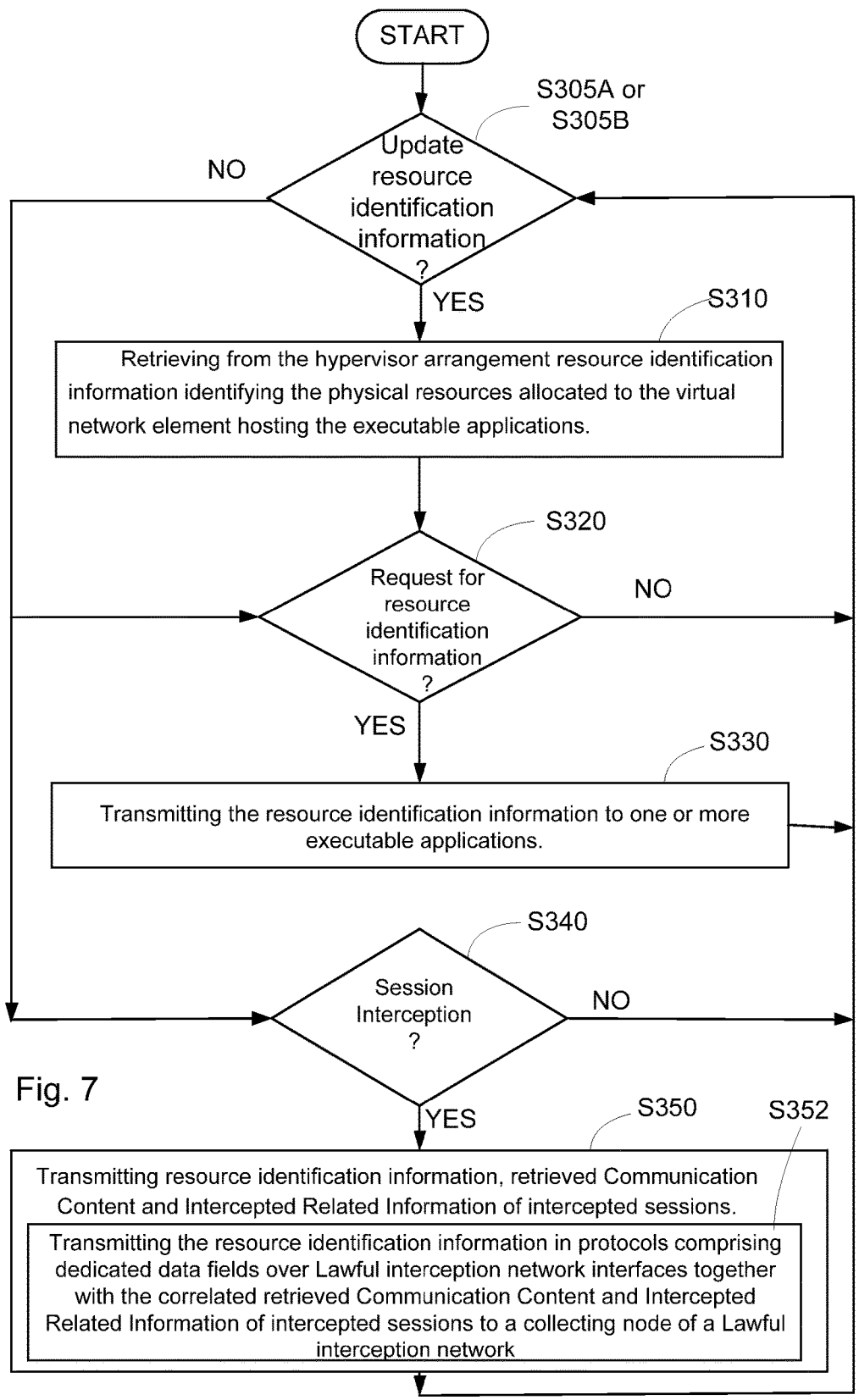
FIG. 7 is a flowchart illustrating a method and embodiments of the method in a virtual network element.

The method and embodiments thereof described hereafter with reference to FIG. 7 may be considered as composed of three separated sub-processes, S310, S330 and S350. The first two sub-processes S310 and S330 have been described above in connection with FIGS. 3A and 3B. The third sub-process S350 is responsible of formatting and delivering the additional information over X interfaces.

In some embodiments, the Mediation Functionality, MF, in the LI site may be configured to communicate with the hypervisor manager 176 or cloud manager 178 via exposed APIs and perform a query to retrieve needed information. Such a configuration is favourable in case the Network Element information retrieved from the PRM and IIF is not enough for regulatory needs, e.g. identity of the geographical location of a physical resource is not available. In further embodiments, the Mediation Functionality may maintain a local cache periodically downloading all the information about cloud infrastructure resources and network topology to avoid revealing the LI activity to hypervisor and/or cloud manager operators.

FIG. 7 is a flowchart illustrating a method and embodiments of the method in a virtual network element.

The method and embodiments thereof is performed in a virtual network element 200 of a telecommunications network having a supporting cloud infrastructure. The cloud infrastructure comprises a virtual data centre 160, which comprises a hypervisor layer 170 managed by a hypervisor manager 176 for allocating physical resources to the virtual network element. Said virtual network element comprises a service application 210 involving means IIF 218 for intercepting subscriber sessions and retrieving Communication Content (CC) and Intercepted Related Information (IRI) of the intercepted sessions. The method comprises:

S310: Retrieving from hypervisor arrangement and/or cloud manager resource identification information identifying the physical resources allocated to the virtual network element hosting the executable applications; and S330:—Transmitting the resource identification information to one or more executable applications; and S350: Transmitting resource identification information, retrieved Communication Content and Intercepted Related Information of the intercepted sessions to a collecting node.

The method may comprise a test, S305, "Update resource identification information?". As described above, the first sub-process, S310, may be triggered by different occasions, e.g. start-up, periodically, etc. If the resource identification information has been updated, the first sub-process S310 is not necessary, "NO". If the resource identification information has not been updated, the first sub-process S310 is necessary, "YES". Thus, the method for retrieving the resource identification information, S310, involves that the PRM module 220 in a virtual network element 200 is triggered to start the retrieving of resource identification data, e.g. at start-up of the network element, on demand of the IIF functionality, or based on periodic interrogation. Thus, method may comprise either:

S305A: "Update resource identification information on demand?" or

S305B: "Update resource identification information periodically?". S305B implies periodical retrieval of the resource identification information about the virtual network element.

S305 is fulfilled, "YES", and triggered at demand. The resource identification information about the virtual network element is retrieved when a demand is received, e.g. at virtual network element start-up;

S305B is fulfilled, "YES", and the retrieving of the resource identification information about the virtual network element is triggered on a periodic basis independent of a demand. The retrieving is performed periodically within specified time periods.

According to some embodiments, the first sub-process, S310, may comprise the steps S312, S314 and S316, as described in connection to FIG. 3A.

The second means 224 of the PRM module 220 is configured to start transmitting the resource identification information HWid to one or more executable applications 210 sending a request for said HWid. The second means 224 is therefore configured to receive a request for resource identification information from any of the applications in the virtual network element 200. It may therefore wait for such a request:

S320:—Request for resource identification information? As long as a request for HWid is not received, "NO", the method will be in a standby loop comprising S305 and S320. If a request for resource identification information HWid is received, the second means 224 of the module 220 is configured to start transmitting the resource identification information HWid to one or more executable applications 210 sending a request for said HWid. Thus, the method 300 further comprises a second sub-process, S330:

S330:—Transmitting the resource identification information to one or more executable applications.

According to some embodiments, the second sub-process, S330, may comprise steps S331, S332 and S333. These steps are described in connection to the embodiments presented in FIG. 3B.

The method 300 will be in a stand-by loop comprising the tests S305, S320 and S340 waiting for any triggering occasion.

If a session interception has been performed, S340, is positive "YES", and S350 is performed. If "NO", the method stays in the stand-by loop and returns to S305.

As illustrated in FIG. 7, S320 and S340 may be performed in parallel.

When an interception is triggered in the IIF, the test of S340 is positive "YES", the means 212 for collecting the resource identification information interrogates the PRM module 220 for said information via a secure interface 214 by sending a question or request for the latest information. If an session interception is not performed in the IIF, "NO", S340, the method returns to S305.

A more detailed description of the above steps, S310 and S330, is presented in the flowcharts in FIGS. 3A and 3B.

The method above may be performed on a virtual network element 200 in a cloud infrastructure. The cloud infrastructure comprises a hypervisor arrangement 170 for allocating physical resources to the virtual network element 200, which virtual network element 200 hosts one or more service applications 210 executable on the virtual network element. The virtual network element hosts further computer program software comprises instructions, which when executed by the physical resources allocated to the virtual network element causes the physical resources to perform the method 300.

In some embodiments, the module is configured to preserve integrity of the retrieved information. Said integrity can be achieved in different ways, e.g. by producing a unique signature for the information, which signature can be checked as a key for identifying the retrieved information. The method may therefore further comprise:

As already stated, the retrieved resource identification information may comprise at least one of the following parameters:

1) VirtualMachineUUID: a unique identification (UUID) of the virtual network element;
2) hostingVirtualDataCenterID: a unique identification of the hosting virtual data centre;
3) hardwareHostIdentifiers: a unique identifier of the physical processor, or hardware (HW), providing computational resources (CPU HW) to the virtual network element and its associated hardware network interfaces;
4) virtualMachineTimeCreation or virtualMachineStartTim: virtual machine creation; modification or start time;
5) virtualMachineGeolocation: geographical location;
6) securityProfile: security profile.

When an interception is triggered in the IIF (YES), in the test of S340, the means 212 for collecting the resource identification information interrogates the PRM module 220 for said information via a secure interface 214 by sending a question or request for the latest information. The PRM module 220 may be triggered to start the retrieving of resource identification data about the network element 200 via the hypervisor or API layer. According to other embodiments, as already described above, the latest information is stored in a volatile memory storage, e.g. cache memory, which the module 220 can collect the information from and send a response back to the IIF means 212 in the IIF service application 210 via the secure interface 214.

The received information may have to be mediated to a suitable common format by the IIF service application 210 and the means 212. The means 212 and the IIF 210 then transmit the resource identification information together with the retrieved Communication Content (CC) over the X3 interface and Intercepted Related Information (IRI) of the intercepted sessions to a collecting node over the X2 interface to the LI site. The resource identification information may be sent in additional fields. According to different embodiments, the resource identification information may be sent either over the X2 interface, or X3 interface or both interfaces. The transmitting of the resource identification information, S350, may further comprise:

S352: Transmitting the resource identification information in protocols comprising dedicated data fields over Lawful interception network interfaces together with the correlated retrieved Communication Content and Intercepted Related Information of the intercepted sessions to a collecting node of a Lawful interception network.

The collecting node may comprise either the functionalities of the physical LI site 14, or the LEMF 12.

The LI site comprises the IRI MF2/DF2 (24, 22) and CC MF3/DF3 (28, 26) functionalities. The MF2/D2 receives data information sent over the X2 interface and the MF3/DF3 receives the data information sent over the X3 interface. The MF2 and/or MF3 are configured to receive and extract the resource identification information from the Communication Content (CC) packets and/or Intercepted Related Information (IRI) packets of the intercepted sessions.

Optionally, if the received information is not enough or complete, the MF2 and/or MF3 may be configured to directly send a request to the hypervisor manager or the cloud manager, via proprietary or standard API.

The Mediation Functionality in a LI site may be adapted to retrieve current resource identification information, e.g. installed hardware (HW), network topology, running virtual network elements (virtual machines), virtual network element geographical location, virtual network element status, virtual network element security profile, etc. Also for these embodiments, the type and number of available virtual network element parameter depends on the technology and vendors.

As for the PRM module 220 in the virtual network element, the retrieval of the information from hypervisor and cloud manager may be done on demand but, for better performance and confidentially enforcement, it is recommended to periodically retrieve it and keep in a volatile cache. This could be necessary to avoid any cloud operator or administrator to reveal LI traffic and to infer target identities from the retrieval process.

Once all the parameters of the virtual network element information are available, i.e. at least the mandatory parameters, from the IRI/CC header, the IRI MF2 24 and/or CC MF3 28 deliver the information to the logical function Delivery Functions 2, DF2, 22, and/or logical function Delivery Functions 3, DF3, 26. Said functions is configured to format the information to the HI standard specification ETSI 3GPP 201 671, if necessary, and to deliver the formatted information to a Law Enforcement Monitoring Facility, LEMF 12. The LEMF 12 may be denoted a collecting node 12. When the LEMF 12 in the collecting node has received the relevant information of the virtual network element where the IIF generated the IRI is running on and can use the information as correlation key in auditing all the physical, hypervisor and middleware elements involved in the related interception.

Figure 8:
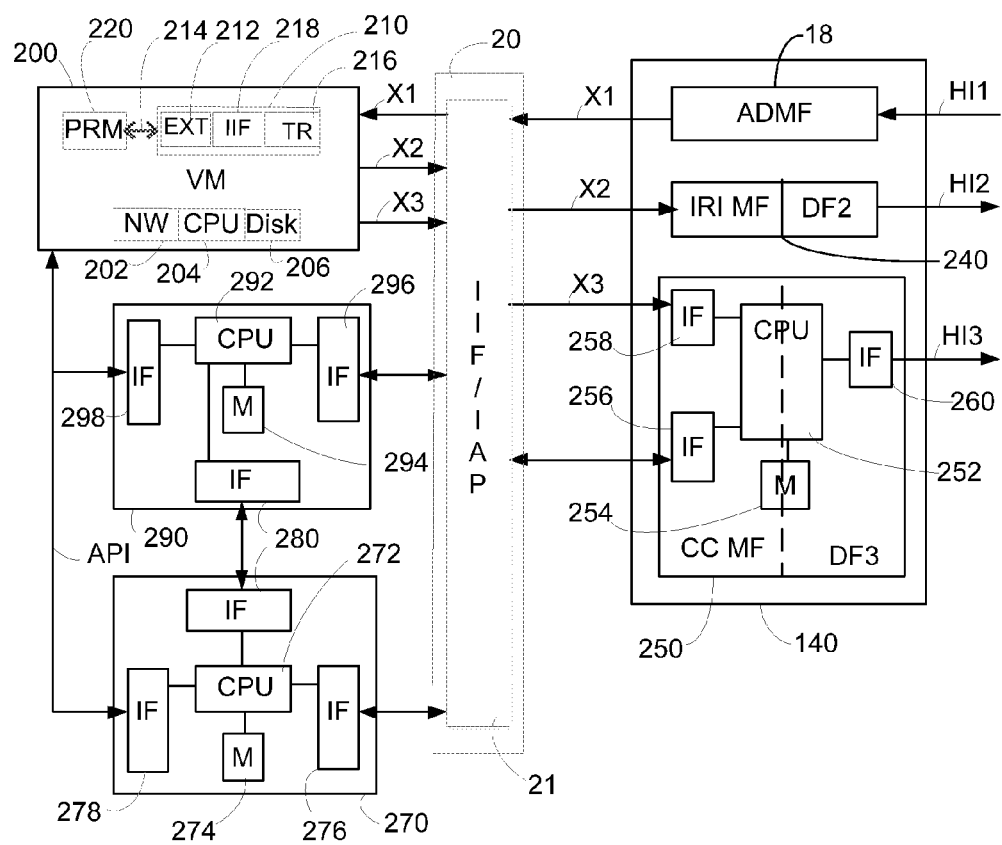
FIG. 8 is a block diagram illustrating an embodiment of a part of a telecommunications network and a LI system in which devices and methods described herein have been implemented.

In FIG. 8, an embodiment of a part of a telecommunications network and a LI system is illustrated.

The illustrated part shows a virtual network element 200, a hypervisor arrangement 270, a cloud manager 290, and a telecommunications network node 20 comprising the IIF/IAP 21 of a telecommunications network and a physical LI site 140 of a LI system. The IIF/IAP is intended as just the interfacing node between the virtual network element and the LI site 140. The physical LI site 140 comprises an ADMF 18, a first mediation function module 240 comprising the IRI MF and DF2 functionalities and a second mediation function module 250 comprising the CC MF and DF3 functionalities. The LI site 140 could be regarded either as a node of the LI network or a site comprising separate nodes providing ADMF functionality and mediation functionalities separately.

The hypervisor arrangement 270 is schematically illustrated and comprises a CPU processor 272 connected to a memory storage 274 and communication interfaces IF 276, 278, 280. The interface IF 276 of the hypervisor arrangement 270 enables communication in both directions with the physical LI site 140 via the telecommunication node 20. The interface IF 278 enables communication in both directions e.g. by means of API protocols as described above (see FIG. 5) with the virtual network element 200. The interface IF 280 enables communication in both directions with the cloud manager 290.

The cloud manager 290 is schematically illustrated and comprises a CPU processor 292 connected to a memory storage 294 and communications interfaces IF 280, 296, 298. The interface IF 280 enables communication in both directions with the corresponding interface 280 in the hypervisor arrangement 270. The interface IF 298 enables communication in both directions e.g. by means of API protocols as described above (see FIG. 5) with the virtual network element 200. The interface IF 296 of the cloud manager 290 enables communication in both directions with the physical LI site 140 via the telecommunication node 20.

The virtual network element 200 is a VM hosting a PRM module 220 and a service application 210. Further, the virtual network element 200 has allocated hardware resources HW of virtual servers represented by virtual Network 202, virtual CPU 204 and virtual disk 206. The service application 210 comprises collecting means 212, transmitting means 216 and a virtualized IIF means 218, which means have been described above in connection with FIG. 6. A secure interface 214 for enabling secure communication is provided between the PRM module 220 and the service application 210. A virtual network element hosting a service application comprising an IIF means has been described above with reference to FIG. 5. The service application 210 encloses the resource identification HWid information into the CC and/or IRI packets via the X3 and/or IRI interface, X2. The service application 210 receives requests, warrants, for interception of target sessions via an X1 interface from the LI site 140 via the IIF/IAP 21 in the telecommunication node 20. The ADMF 18 receives such requests over the HI1 interface from a LEMF (not shown) or via an interface directly on ADMF (18) by an operator (not shown) acting according to a legal warrant (i.e. a written legal authorization).

The ADMF 18 mediates such requests over the X1 interface via the IIF/IAP 21 to the virtual network element 200 and the service application 210 comprising the virtualized IIF functionality 218.

In the example illustrated in FIG. 8, the second mediation function module 250 is showed in more detail. However, the first mediation function module 240 may be designed in the same way. Further, according to some embodiments herein, the first and second mediation function modules may be reduced to only one mediation function module comprising one CPU processor unit executing and performing both mediation functionalities. A mediation function module provides both mediation functionality and deliver functionality.

The second mediation function module 250 comprises a CPU processor 252 connected to a memory storage 254 and different communication interfaces IF 256, 258, 260. One of the communication interfaces IF 258 receives the CC data packages over the X3 interface according to an X3 protocol via the node 20 and its IIF means 210. Said data packages carry resource identification information in dedicated data fields. Further, the CC MF and DF3 module 250 comprises a communication interface IF 260 that is configured to transmit the CC data packages over the HI3 interface according to a HI3 protocol in dedicated data fields to a LEMF 12 (not shown) in the LI system. It further comprises a communication interface IF 256 for enabling communication with the hypervisor manager 270 and the cloud manager 290. As illustrated in the example of FIG. 8, the CPU processor 252 and its memory storage 254 serve both the mediation functionality, CC MF, and the deliver functionality, DF3. As understood by a skilled person, the CC MF and DF3 may be supported by separate CPU processors and memory storages.

The first mediation function module 240 may comprise corresponding functional features as described for the second mediation function module 250 with the difference that the first mediation function module 240 handles the IRI information while the second mediation function module 250 handles the CC content.

The mediation functionality of the CPU processor 252 is configured to extract the enclosed resource identification information HWid from the received CC and/or IRI packets via the X3 and/or X2 interfaces. The resource identification information HWid comprises all or some of the parameters 1) to 6) as described above.

A complete set of HWid parameters comprise at least the mandatory parameters.

The received parameters 1) to 6) is formatted by the CPU processor and further sent via the HI3 and/or HI2 interfaces to an addressed LEMF (not illustrated). The HI3 and HI2 interfaces has been adapted to carry said parameters in dedicated data fields of the HI3 interface protocol and HI2 interface protocol, respectively. Examples of said fields are presented further down in this detailed description.

However, some of the parameters in the resource identification HWid information may be missing in the CC and/or IRI data packets received via the X3 and/or IRI interface, X2. In the following, a method and embodiments thereof are provided and described, which method enables adding of missing resource identification information HWid into Communication Content and Intercepted Related Information of an intercepted subscriber/target session in a node of the LI network.

Figure 9:
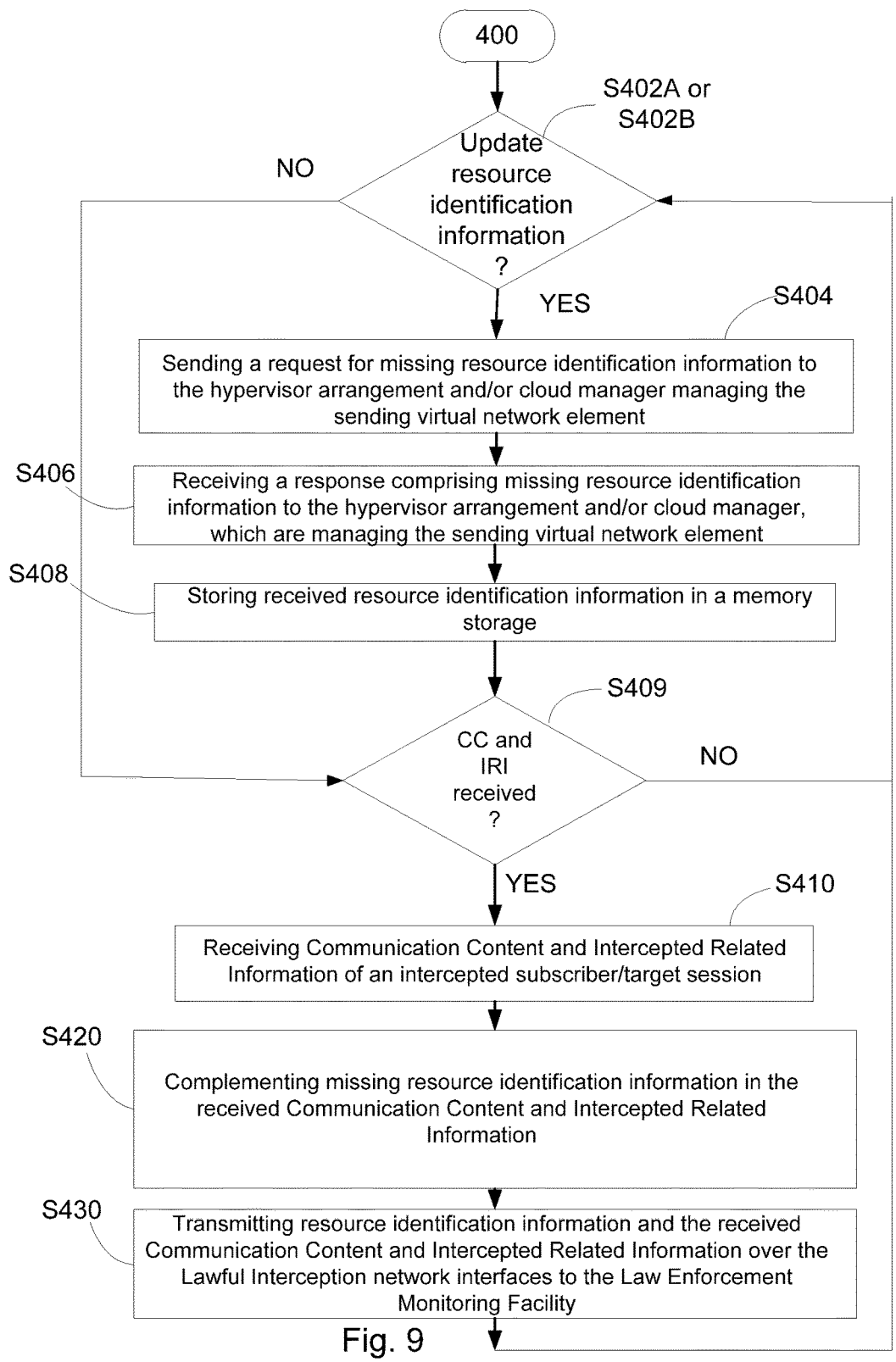
FIG. 9 is a flowchart illustrating a method according to one aspect for adding resource identification HWid information into Communication Content and Intercepted Related Information of an intercepted subscriber/target session.
Figure 10:
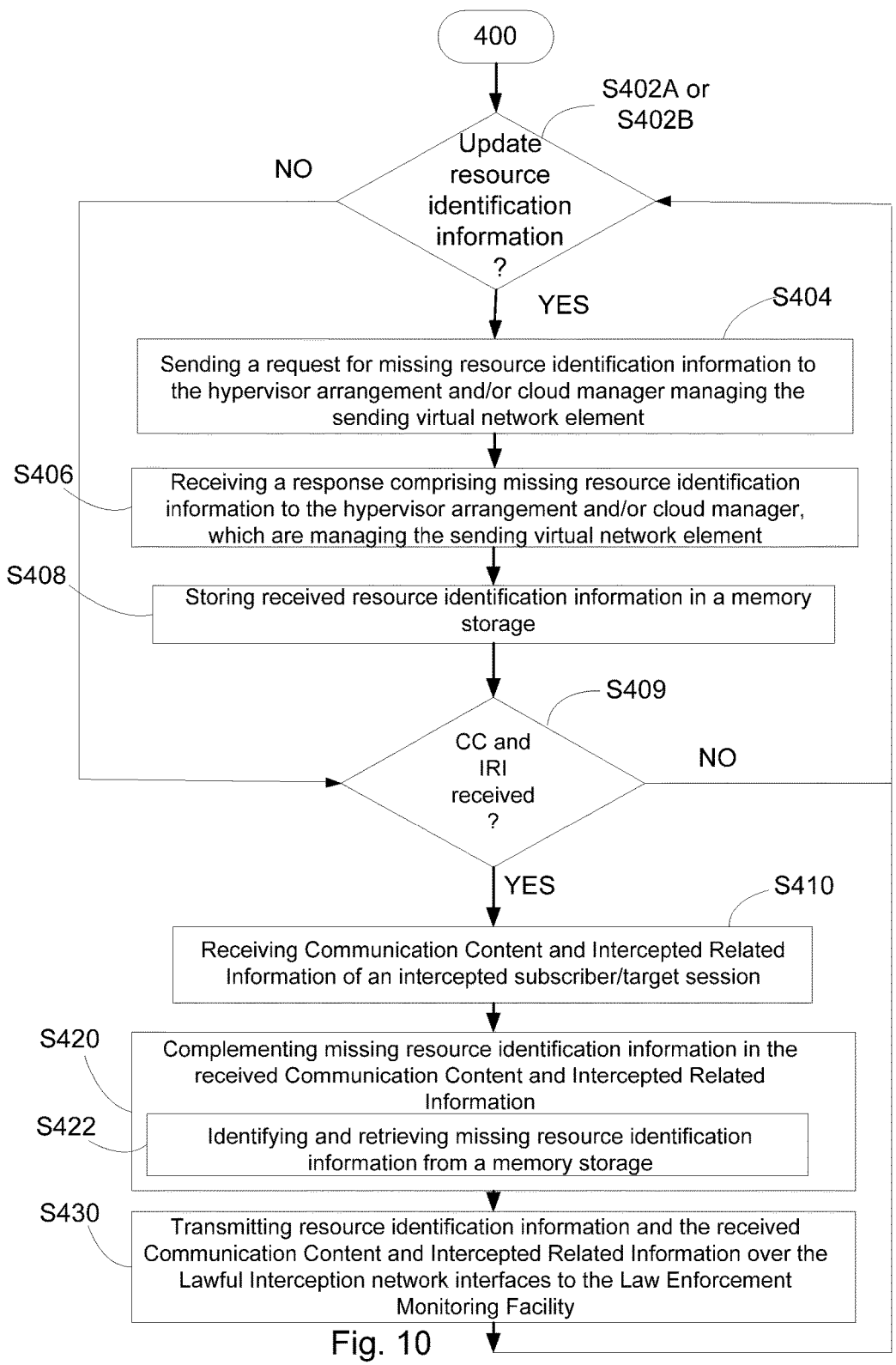
FIG. 10 is a flowchart of an embodiment of the method illustrated in the flowchart in FIG. 9.

The method and embodiments thereof described hereafter with reference to FIGS. 9 and 10 may be considered as composed of two separated sub-processes, a first sub-process for retrieving the HWid information about the virtual network element from the hypervisor arrangement and cloud manager and update the mediation functionality module, and the second sub-process responsible of formatting and delivering the information over HI2 and/or HI3 interfaces to a LEMF.

In FIG. 9, a flowchart is enclosed illustrating a method 400 for adding resource identification HWid information into Communication Content and Intercepted Related Information of an intercepted subscriber/target session.

The method may comprise a test, S402, "Update resource identification information?". The first sub-process for updating a mediation module by retrieving the information about the virtual network element from the hypervisor arrangement and cloud manager may be triggered by different occasions, e.g. start-up, periodically, etc. If the resource identification information has been updated, the first sub-process is not necessary (NO). If the resource identification information has not been updated, the first sub-process is necessary (YES). Thus, the CPU processor of a mediation function module is triggered to start the retrieving of resource identification data, e.g. at start-up of the network element, on demand of the IIF functionality, or based on periodic interrogation. Thus, the method may comprise either:

S402A: Update resource identification information on demand?; or

S402B: Update resource identification information periodically?;

S402A is triggered when a demand criterion is fulfilled (YES). Such a demand could be defined as, e.g. reception of CC and/or IRI packets via the X3 and/or X2 interfaces.

S402B is fulfilled (YES) and the retrieving of the resource identification information about the virtual network element is triggered on a periodic basis independent of the reception of CC and/or IRI packets via the X3 and/or X2 interfaces. The retrieving is performed periodically within specified time periods.

If the first sub-process is not necessary (NO) in S402, the method goes to a test in S409: "CC and IRI received?". When CC and/or IRI packets via the X3 and/or X2 interfaces are received, the test of S409 is positive (YES), the second sub-process is performed. If the test criterion in S409 is not fulfilled (NO), the method returns to S402. The method will be in a stand-by loop comprising the tests S402 and S409 waiting for any triggering occasion.

A CPU processor of a mediation function module is configured to perform both the first test S402 and S409.

According to one aspect, the mediation functionality modules 240, 250 of the node 140 is adapted to retrieve said parameters of the resource identification information HWid via proprietary or standard API.

The first sub-process is designed for retrieving and complementing the HWid information about the virtual network element from the hypervisor arrangement and cloud manager, said sub-process of the method comprises:

S404:—Sending a request for missing resource identification information to the hypervisor arrangement and/or cloud manager managing the sending virtual network element. When a mediation function module 240, 250 receives CC and IRI information from virtual network element 200, the CPU processor 252 is configured to identify missing resource identification HWid information and to send a request, e.g. in a message, for missing HWid information to the hypervisor arrangement 270 and/or cloud manager 290 managing the sending virtual network element 200. The hypervisor arrangement 270 and/or cloud manager 290 is configured to respond to the request by sending a response comprising at least the missing HWid if said HWid parameter or parameters are available;

S406:—Receiving a response comprising missing resource identification information from the hypervisor arrangement and/or cloud manager, which are managing the sending virtual network element. The CPU processor 252 is configured to receive a response comprising missing HWid to the hypervisor arrangement 270 and/or cloud manager 290. The response may comprise all HWid parameters, or only the missing HWid parameters, or only the parameters that are available for the hypervisor arrangement 270 and/or cloud manager 290;

S408:—Storing received resource identification information in a memory storage. The CPU processor 252 is further configured to store received resource identification HWid information in a memory storage 254. The storing of the missing HWid parameters may imply that the CPU processor 252 creates a complete set of HWid parameters in the storage 254 by gathering the HWid for a virtual network element 200 together.

The method 400 for adding resource identification information HWid into Communication Content and Intercepted Related Information of an intercepted subscriber/target session comprises further a second sub-process, which is responsible of formatting and delivering the information over HI2 and/or HI3 interfaces to a LEMF. The second sub-process comprises:

S410:—Receiving Communication Content and Intercepted Related Information of an intercepted subscriber/target session. The CPU processor 252 is configured to receive CC and IRI of an intercepted subscriber/target session and to extract and identify missing resource identification HWid information in the received CC and IRI. If the CPU processor identifies missing HWid parameters in a set of HWid parameters, the CPU processor performs S420:

S420:—Complementing missing resource identification HWid information in the received Communication Content and Intercepted Related Information. The retrieval of the parameters of the HWid can be triggered and performed on demand, e.g. if any of the parameters is missing in the received CC and/or IRI data packets. However, for better performance and confidentiality enforcement, periodical update of HWid parameters is preferred. When periodical update is used, the parameters have been stored in a memory storage 254, e.g. a volatile cache memory storage, as already described in S408 of the first sub-process. The CPU processor 252 is further configured to complement missing resource identification HWid information in the received Communication Content and Intercepted Related Information either on demand or periodically. When S420 has been executed, the CPU processor 252 in the mediation functionality is capable of transmitting a complete set of HWid parameters together with the CC and/or IRI in the data packets to be sent over the Lawful Interception network interfaces HI2 and HI3 to a Law Enforcement Monitoring Facility, see S430 next;

S430:—Transmitting resource identification information HWid and the received Communication Content and Intercepted Related Information over the Lawful Interception network interfaces to a Law Enforcement Monitoring Facility. The CPU processor 252 is configured to format and transmitting resource identification information HWid and the received CC and IRI over the Lawful Interception network interfaces HI2 and/or HI3 in dedicated data fields to a Law Enforcement Monitoring Facility, LEMF 12 (see FIG. 6). The dedicated data fields may be regarded as extensions to the HI2 and HI3 protocols. When S430 has been executed, the method returns to into a stand-by loop comprising the tests S402 and S409 waiting for any triggering occasion.

In FIG. 10, a flowchart is presented illustrating of an embodiment of the method 400 for adding resource identification HWid information into Communication Content and Intercepted Related Information of an intercepted subscriber/target session. This embodiment of the method 400 described above further involves S422 in S420. Thus, S420 comprises:

S422: Identifying and retrieving missing resource identification information from a memory storage. The CPU processor 252 is further configured to identify missing HWid parameter or parameters in the received CC and IRI data packets and to search for and retrieve the missing resource identification information from a memory storage 254. The CPU processor 252 complements the missing resource identification HWid information in the received CC and IRI.

A number of embodiments of the present invention have been described. It will be understood that various modifications may be made without departing from the scope of the invention. Therefore, other implementations are within the scope of the following claims defining the invention.

The need of transmitting resource identification information parameters in specified information fields implies an extension of the current Lawful Interception standard interfaces. The requirement to provide a Network Element Identifier, NEID, in the IRI delivered to the LEMF is present in most common LI standards.

Following example is a proposal for said virtual network element parameter extensions based on the standard document ETSI/3GPP TS 33.108, which also refers to ETSI ES 201 671.

The Network Identifier (NID) is a mandatory parameter; it should by internationally unique. It consists of one or both of the following two identifiers:

Operator identifier (NO/AN/SP) (mandatory): Unique identification of Network Operator (NO), Access Network Provider (AN) or Service Provider (SP);

Network Element Identifier (NEID) (optional):

The purpose of the network element identifier is to uniquely identify the relevant network element carrying out the LI operations, such as LI activation, IRI record sending, etc.

A network element identifier may be:
an E.164 international node number;
an X.25 address;
an IP address.

In case of IIF deployed as a virtual machine instance of a virtual network element on a cloud infrastructure or virtual data centre, to uniquely identify the virtual network element the VM information are concatenate to existing NEID parameter and should be composed by the following additional fields:

National regulations may mandate the sending of the NEID.

In case of IIF deployed as a virtual machine instance of a virtual network element on a cloud infrastructure or virtual data centre, to uniquely identify the virtual network element it should be also composed by the following additional fields for the parameters:

1) VirtualMachineUUI;
2) hosting VirtualDataCenterID;
3) hardwareHostIdentifier;
4) virtualMachineTimeCreation or virtualMachineStartTim;
5) virtualMachineGeolocation;
6) securityProfile.

Of the listed collected information, the first three 1)-3) are identifier parameters which may be considered as mandatory. The above list may be changed or extended with other parameters if useful and available given that the increment of the IRI size shall not impact on the LI performance requirements.

The parameters 4), 5) and 6), and eventually other parameters, could be retrieved directly by LEA or mediation function from the cloud infrastructure data on the base on the bases of the first three, i.e. 1), 2) and 3). To provide them or not is will a matter of balancing security, performance and national LI options.

Further, a modification example or extension of the ASN.1 data fields of the HI2 interface described in ETSI ES 201 671 is proposed hereafter. It could be applied also to HI3, if needed.

```
Network-Identifier : : = SEQUENCE
{
Operator-Identifier                      [0] OCTET STRING (size (1 . . . 5) ),
- - It is a notification of the NW/AP/SvP in ASCII —characters.
- - The parameter is mandatory.
Network-Element-Identifier         [1] Network-Element-Identifier OPTIONAL
. . .
Virtual-Network-Element-Identifier  [2] Virtual-Network-Element-Identifier OPTIONAL
}
Virtual-Network-Element-Identifier : : = SEQUENCE
{
  VirtualMachineUUID                     [0] OCTET STRING (SIZE(1 . . . 16) )
  - - virtual machine unique identifier
  hosting VirtualDataCenterID            [1] OCTET STRING (SIZE(1 . . . 16) )
  hardwareHostIdentifiers                [2] HardwareHostIdentifiers
  virtualMachineTimeCreation             [3] TimeStamp OPTIONAL
  virtualMachineStartTime                [4] TimeStamp
  virtualMachineGeolocation              [5] VirtualMachineGeolocation OPTIONAL
  securityProfile                        [6] SecurityProfile OPTIONAL
  . . .
}
HardwareHostIdentifiers : : = SEQUENCE
{
```

```
  hardwareHostId                       [0] OCTET STRING (SIZE(1 . . . 16) )
  hardwareNetworkInterfaces            [1] HardwareNetworkInterfaces
  . . .
}
  HardwareNetworkInterfaces : : = SET SIZE (1 . . . 256) OF OCTET STRING
  (SIZE(1 . . . 6) )
VirtualMachineGeolocation : : = SEQUENCE
{
  juridictionId                        [0] OCTET STRING (SIZE(1 . . . 8) )
  latitude                             [1] PrintableString (SIZE(7 . . . 10))
  - - format: XDDMMSS.SS
  latitude                             [2] PrintableString (SIZE(8 . . . 11))
  - - format: XDDDMMSS.SS
}
SecurityProfile : : = SEQUENCE
{
  userID                               [0] OCTET STRING (SIZE(1 . . . 16) )
  tenantId                             [1] OCTET STRING (SIZE(1 . . . 16) ) OPTIONAL
  signature                            [2] OCTET STRING (SIZE(1 . . . 256) )
  . . .
}
TimeStamp : : = CHOICE
{
  - - The minimum resolution required is one second.
  - - "Resolution" is the smallest incremental change that can be measured for time
and
  - - is expressed with a definite number of decimal digits or bits.
  localTime                            [0] LocalTimeStamp
  utcTime                              [1] UTCTime
}
LocalTimeStamp : : = SEQUENCE
{
  generalizedTime                      [0] GeneralizedTime
  - - The minimum resolution required is one second.
  - - "Resolution" is the smallest incremental change that can be measured for time
and
  - - is expressed with a definite number of decimal digits or bits.
  winterSummerIndication               [1] ENUMERATED
  {
    notProvided(0),
    wintertime(1),
    summertime(2),
    . . .
  }
}
```

A number of advantages are provided by the above described methods and node solutions.

An improved capability to legally validate and audit the entire interception process executed in a telecommunication cloud infrastructure by a virtualized IIF.

Further, it is provided a simplified correlation between IRIs and CC produced by a virtualized IIF to all the related logs collected in the various layer of a cloud infrastructure.

As further consequence, the correlation enhances overall security of the LI solution. The time to find relevant information during forensic and security incident investigation is reduced. The provided solution further enables LI security anomaly detection by the MF like the identification of unauthorized or fake VM performing LI by means of the security profile.

A possibility is also provided to the MF to immediately check the legal validity of received IRI and CC with respect to the geographical location of the HW actually intercepting it. In other words, the MF can discard the IRI and CC and trigger an LI alarm if the interception is executed by a virtual IIF running on a HW located outside the legal jurisdiction where the target is allowed to be intercepted.

A number of embodiments have been described. It will be understood that various modifications may be made without departing from the scope of this disclosure. Therefore, other implementations are within the scope of the following claims.

REFERENCES

[1] 3GPP TS 33.106 "Lawful Interception requirements (Release 8)";
[2] 3GPP TS 33.107 "Lawful interception architecture and functions (Release 8)";
[3] 3GPP TS 33.108 "Handover interface for Lawful Interception" (Release 8);

The invention claimed is:

1. A method for retrieving resource identification information identifying physical resources hosting a node in a telecommunications network, said node being supported by a cloud infrastructure comprising a hypervisor arrangement and a cloud manager that create a virtual network element, the physical resources and service applications being allocated to the node via the virtual network element, the service applications being executed using the physical resources, the method comprising:
  retrieving, from the hypervisor arrangement and/or the cloud manager, resource identification information identifying the physical resources hosting the virtual network element for the service applications; and transmitting the resource identification information to one or more of the service applications, wherein said node being supported by the cloud infrastructure comprises a virtualized Internal Interception Function intercepting a subscriber session and retrieving Communication Content and Intercepted Related Information of the intercepted subscriber session, wherein the transmitting of the resource identification information further comprises transmitting the Communication Content and Intercepted Related Information to the one or more of the service applications, and wherein the retrieved resource identification information identifies comprises a unique identifier of a physical processor, or hardware (HW), providing computational resources (CPU HW) to the virtual network element and associated hardware network interfaces.

2. The method according to claim 1, wherein the retrieving includes:
sending a request for the resource identification information to the hypervisor arrangement and/or the cloud manager;
receiving a response from the hypervisor arrangement and/or the cloud manager, wherein the response comprises the resource identification information; and
storing the resource identification information in allocated memory storage.

3. The method according to claim 2, wherein the transmitting of the resource identification information includes:
receiving a request for the resource identification information from an application;
retrieving the resource identification information for the requesting application from the allocated memory storage; and
sending a response to the requesting application.

4. The method according to claim 1, the method further comprises: triggering the retrieving of the resource identification information on demand.

5. The method according to claim 1, the method further comprises: periodically triggering the retrieving of the resource identification information.

6. The method according to claim 1, the method further comprising: storing the retrieved resource identification information in an allocated memory storage.

7. The method according to claim 1, wherein the retrieved resource identification information comprises further comprises a unique identification (UUID) of the virtual network element.

8. The method according to claim 1, wherein the retrieved resource identification information also comprises a unique identification of a hosting virtual data centre.

9. The method according to claim 1, wherein the retrieved resource identification information also comprises a virtual machine creation, a modification or a start time, a geographical location or a security profile.

10. The method according to claim 1, wherein the transmitting of the resource identification information comprises:
transmitting together with the resource identification information, retrieved Communication Content and Intercepted Related Information of intercepted sessions.

11. The method according to claim 10, wherein the resource identification information together with the retrieved Communication Content and Intercepted Related Information of the intercepted sessions are transmitted in protocols comprising dedicated data fields over Lawful interception network interfaces to a collecting node of a Lawful interception network.

12. A method for retrieving resource identification information identifying physical resources hosting a node in a telecommunications network, said node being supported by a cloud infrastructure comprising a hypervisor arrangement and a cloud manager that create a virtual network element, the physical resources and service applications being allocated to the node via the virtual network element, the service applications being executed using the physical resources, the method comprising:
retrieving, from the hypervisor arrangement and/or the cloud manager resource, identification information identifying the physical resources hosting the virtual network element for the service applications, and further, one or more of a virtual machine creation, a modification or a start time, a geographical location, and a security profile; and
transmitting the resource identification information to one or more of the service applications,
wherein the retrieved resource identification information comprises a unique identifier of a physical processor, or hardware (HW), providing computational resources (CPU HW) to the virtual network element and associated hardware network interfaces.

\* \* \* \* \*